(12) United States Patent
Trott

(10) Patent No.: US 7,474,677 B2
(45) Date of Patent: Jan. 6, 2009

(54) WIRELESS COMMUNICATING

(75) Inventor: Christian A. Trott, Durham, NC (US)

(73) Assignee: Bose Corporation, Framingham, MA (US)

( * ) Notice: Subject to any disclaimer, the term of this patent is extended or adjusted under 35 U.S.C. 154(b) by 848 days.

(21) Appl. No.: 10/640,215

(22) Filed: Aug. 12, 2003

(65) Prior Publication Data

US 2006/0250973 A1 Nov. 9, 2006

(51) Int. Cl.
*H04J 3/24* (2006.01)

(52) U.S. Cl. .................................................... 370/473

(58) Field of Classification Search ........................ None
See application file for complete search history.

(56) References Cited

U.S. PATENT DOCUMENTS

| | | |
|---|---|---|
| 5,812,056 A | 9/1998 | Law |
| 6,344,727 B1 | 2/2002 | Desai et al. |
| 6,346,692 B1 | 2/2002 | Ubowski et al. |
| 6,377,608 B1 | 4/2002 | Zyren |
| 6,510,210 B1 | 1/2003 | Baughan |
| 6,591,085 B1 | 7/2003 | Grady |
| 6,608,399 B2 | 8/2003 | McConnell et al. |
| 6,633,482 B2 | 10/2003 | Rode |
| 6,772,212 B1 | 8/2004 | Lau et al. |
| 6,813,528 B1 | 11/2004 | Yang |
| 6,830,160 B2 | 12/2004 | Risolia |
| 6,925,180 B2 | 8/2005 | Iwamura |
| 7,079,516 B2 * | 7/2006 | You et al. ............ 370/337 |
| 2001/0008522 A1 * | 7/2001 | Padovani et al. ......... 370/332 |
| 2002/0038459 A1 | 3/2002 | Talmola et al. |
| 2002/0072817 A1 | 6/2002 | Champion |
| 2002/0103008 A1 | 8/2002 | Rahn et al. |
| 2002/0155860 A1 | 10/2002 | Tordera et al. |
| 2002/0188723 A1 | 12/2002 | Choi et al. |
| 2003/0007473 A1 * | 1/2003 | Strong et al. ........... 370/338 |
| 2003/0022672 A1 * | 1/2003 | Yoshii et al. ........... 455/450 |

(Continued)

FOREIGN PATENT DOCUMENTS

EP 0621707 10/1994

(Continued)

OTHER PUBLICATIONS

H.Gan, B. Treister, Adaptive Frequency Hopping, a Non-Collaborative Coexistence mechanism, IEEE, pp. 1-40, Mar. 12, 2001, Austin, TX, www.iee802.org, Working Group for Wireless Personal Area Networks, Online!, Mar. 12, 2001, pp. 1-40.

(Continued)

*Primary Examiner*—Chi Pham
*Assistant Examiner*—Thai Hoang
(74) *Attorney, Agent, or Firm*—Fish & Richardson P.C.

(57) ABSTRACT

A wireless communication method for transmitting data from at least one master to one or more slaves positioned at various spatial locations and configured for generally simultaneous reception of the data. The method includes dividing the data into a number of portions, transmitting at least some of the portions using different transmission configurations for the different portions, having one or more of the slaves measure the quality of transmission associated with the group of different transmission configurations, and processing the quality measurements to determine new transmission configurations for use in transmitting the data.

19 Claims, 24 Drawing Sheets

U.S. PATENT DOCUMENTS

| | | |
|---|---|---|
| 2003/0054829 A1* | 3/2003 | Moisio ............... 455/452 |
| 2003/0059022 A1 | 3/2003 | Nebiker et al. |
| 2003/0073432 A1 | 4/2003 | Meade, II |
| 2003/0198015 A1 | 10/2003 | Vogt |
| 2003/0236075 A1 | 12/2003 | Johnson et al. |
| 2004/0137849 A1 | 7/2004 | Kloper et al. |
| 2004/0151327 A1 | 8/2004 | Marlow |
| 2004/0162029 A1 | 8/2004 | Grady |
| 2004/0224638 A1 | 11/2004 | Fadell et al. |
| 2005/0049002 A1 | 3/2005 | White et al. |
| 2005/0147951 A1 | 7/2005 | Rohrbach |
| 2005/0191964 A1 | 9/2005 | Hundal |
| 2005/0289224 A1 | 12/2005 | Deslippe et al. |
| 2006/0012488 A1 | 1/2006 | Hilbrink et al. |
| 2006/0127034 A1 | 6/2006 | Brooking et al. |
| 2006/0233191 A1 | 10/2006 | Pirzada et al. |
| 2008/0022305 A1 | 1/2008 | Thompson |

FOREIGN PATENT DOCUMENTS

| | | |
|---|---|---|
| EP | 0692882 A2 | 1/1996 |
| EP | 0784386 A2 | 1/1997 |
| EP | 0692882 A3 | 5/1997 |
| EP | 0909112 A1 | 4/1999 |
| EP | 1096717 A2 | 5/2001 |
| EP | 1107624 A2 | 6/2001 |
| EP | 1124339 A2 | 8/2001 |
| EP | 1130858 A2 | 9/2001 |
| EP | 1146775 A2 | 10/2001 |
| EP | 1 195 931 | 4/2002 |
| EP | 1267523 A1 | 12/2002 |
| EP | 1271853 A | 1/2003 |
| EP | 1107624 A3 | 3/2003 |
| EP | 1 624 446 | 2/2006 |
| EP | 1 635 607 | 3/2006 |
| JP | 2001275194 A1 | 10/2001 |
| JP | 2003152613 A | 5/2003 |
| JP | 2003-196919 | 7/2003 |
| WO | WO94/03002 | 2/1994 |
| WO | WO97/29550 | 8/1997 |
| WO | WO 99/09669 | 2/1999 |
| WO | WO00/76272 A2 | 12/2000 |
| WO | WO01/52436 A1 | 7/2001 |
| WO | WO 03/008060 | 1/2003 |
| WO | WO 03/075556 | 9/2003 |
| WO | WO 2006/065228 | 6/2006 |

OTHER PUBLICATIONS

Chiasserini CF et al, Coexistence mechanisms for interference mitigation, IEEE, Conference on Computer Communications 21st, New, NY, Jun. 23-27, 2002, vol. 1 of 3, Conf. 21, Jun. 22, 2002, pp. 590-598.

Kato M et al.: "Experiemental Assessment of Media Synchronization Qualityin IEEE 802.11b Under bluetooth interference" The 14th IEEE 2003 International Symposium On Personal, Indoor And Mobile Radio Communication Proceedings vol. 2, Sep. 7, 2003, pp. 2683-2689.

Young-Hwan You et al: "Performance of simple timing synchroization and DC-offset compensaton schemes for a short-ranged bluetooth network" IEEE 2000 Conference vol. 2, Sep. 18, 2000, pp. 1320-1324.

Johansson P. et al: "Bluetooth: an enabler for personal area networking". IEEE Inc., NY US, vol. 15, Sep. 2001, pp. 28-37.

Wu H et al: "Integrated Cellular And Ad Hoc Relaying Systems, ICAR". IEEE Journal, NY, US, vol. 19 No. 10, Oct. 2001, pp. 2105-2115.

Tin Yu Wu et al: "A relay scheme for incapable nodes within a CDMA based IPY6 network using ad-hoc mechanism" Information Technology Research and Education, 2003. Proceedings, ITRE 2003. International Conference, Aug. 11-13, 2003, Piscataway, NJ, US, IEEE, Aug. 11, 2003, pp. 142-146.

Bilan Apps: "Streaming audio over bluetooth ACL links". Proceedings of the International Conference on Information Technology, Computers and Communication ITTC 03, Apr. 28, 2003, pp. 287-291.

European Office Action, Nov. 22, 2007, U.S. Appl. No. 04 103 624.5, 4 pages.

"Altec Lansing inMotion iM3 User's Guide," Altec Lansing Technologies, Inc. Copyright 2003.

"Bose Link AL8 Homewide Wireless Audio Link Owner's Guide, " Bose Corporation, Copyright 2005.

"Bose Link AR1 Wireless Audio Receiver Owner's Guide," Bose Corporation, Copyright 2005.

"Bose SoundDock Digital Music System Owner's Guide," Bose Corporation, Copyright 2005.

"Creative Home Kit - Jukebox 3" [retrieved on Aug. 8, 2005]. Retrieved from the internet: URL:http://www.creative.com/products/product.asp?category=13&subcategory=57&product=497&nav=0.

"Delphi SKYFi Audio System, " XM Radio [retrieved on Aug. 11, 2005]. Retrieved form the internet: <URL: http://www.xmradio.com/catalog/print/skyfi_audio_system.html>.

"Emerson radio Personal CD Player-Wireless Transmitter," Emerson Radio [retrieved on Oct. 3, 2005]. Retrieved from the internet: <URL: http://www.emersonradio.com/SearchDex/10791.htm>.

Jacobson, "NuVo's Wireless iPod Docking Station for Multiroom Audio," Talk About CEDIA, Sep. 5, 2006, [retrieved on Sep. 22,2006]. Retrieved from the Internet: <URL: http://www.talkaboutcedia.com/article/10246/It's >.

"Philips Wireless Music Center,"Sound & Vision, p. 54 (Jul./Aug. 2006).

"Sirius Satellite Radio Sportster SP-B1 Boombox User Guide," Copyright 2004 (Rev. 1, Aug. 2004).

Office action dated Nov. 3, 2006 from China Application No. 200410056682.4.

Office Action date Nov. 2, 2007 from China Application No. 200410056682.4.

Partial European Search Report dated Nov. 19, 2004 from European Application No. 04103624.5.

European Search Report dated Feb. 9, 2005 from European Application No. 04103624.5.

Examination Report dated Oct. 28, 2005 from European Application No. 04103624.5.

Examination Report dated Nov. 20, 2006 from European Application No. 04103624.5.

European Search Report dated May 15, 2006 from European Application No. 05113075.5.

International Search Report and Written Opinion dated May 29, 2008 from International Application No. PCTUS2007/077000.

Action and Response History retrieved from PAIR for U.S. Application No. 11/050,160, through Jun. 5, 2008.

* cited by examiner

WIRELESS COMMUNICATING

The invention relates to wireless communicating.

COMPUTER PROGRAM LISTING APPENDIX ON COMPACT DISC

An accompanying replacement CD (submitted in duplicate copies labeled copy 1 and copy 2) each contain the following three text files that are in ASCII hex IBM-PC format compatible with the MS-Windows operating system. The text files may be opened and viewed using Microsoft Windows Notepad. The text files were generated from files that were executable on the platform identified in the right-hand column of the following table:

| Name | Size | Date of creation | Platform |
| --- | --- | --- | --- |
| MASTER.TXT | 224 Kbyte | Executable originally created as MASTER.BIN on Aug. 5, 2003, converted to Intel HEX format (ASCII) on Apr. 20, 2004. Saved in .txt format on Nov. 7, 2005. | Motorola DSP56367 chip (block 526 on the schematics). |
| SLAVE.TXT | 262 Kbyte | Executable originally created as SLAVE.BIN on Aug. 5, 2003, converted to Intel HEX format (ASCII) on Apr. 20, 2004. Saved in .txt format on Nov. 7, 2005. | Motorola DSP56367 chip (block 526 on the schematics). |
| ProgrammableLogicChip.txt | 6 Kbyte | Executable originally created as PROGRAMMABLELOGICCHP.POF on Aug. 5, 2003, converted to Intel HEX format (ASCII) on Apr. 20, 2004. Saved in .txt format on Nov. 7, 2005 | EPM3032ATC44-10- a programmable logic device (PLD) manufactured by Altera, headquartered in San Jose, CA (block 520 on the schematics). |

BACKGROUND OF THE INVENTION

Wireless communicating is utilized in wide ranging applications, for example, in cellular phones, controlling devices, and exchanging data signals among two or more devices.

DEFINITION OF TERMINOLOGY

Master: A node on the network that is in control of how communications will be managed between itself and a set of slaves.

Slave: A node on the network that communicates with a master.

Primary Data: The information that is presented to the master for the purpose of reliably transmitting representative signals to one or more of the slaves.

Ancillary Data: Data that is presented to a master or a slave represented by signals to be transmitted to another node on the network, with possibly poorer reliability and latency than that of the primary data.

Management Data: Data represented by signals that are transmitted across the network for the purpose of maintaining the performance of the network.

Transmission Parameter: A controllable characteristic that affects the performance of the communication system (for instance: signal power, center frequency, modulation technique, phase, antenna direction, antenna directivity, antenna position, signal polarization, time slot, equalizer setting, chipping sequence, and other characteristics).

Transmission Configuration: One or more transmission parameters with an associated value (e.g., signal power—200 mW, center frequency—2450 MHz, Modulation technique—4FSK.)

Transmission Quality Aggregation: A process whereby a node, such as the master on the network, develops its transmission quality estimation based at least in part on the transmission quality estimations of other nodes in the network.

Preferred Configuration List: A list of different transmission configurations that are used or intended to be used in the short term for transmission.

Potential Configuration List: A list of transmission configurations that are not used nor intended to be used in the short term for transmission, but could potentially be used at some point in the future for that purpose.

Packet: A collection of data signals that are transmitted contiguously using the same transmission configuration.

Block: A collection of packets containing data signals that together can be independently decoded by an error correction decoder. A block will preferably be transmitted using a variety of transmission configurations so as to average out the effects of localized channel degradation.

Frame: A collection of blocks and management packets that are transmitted using the preferred configuration list.

Stream: A contiguous flow of data bit signals that together represent the information from a single source (such as audio from FM radio or a CD player). A stream can contain more than one channel (such as left and right).

SUMMARY OF THE INVENTION

In a first aspect, the invention features a communication method for transmitting data signals from at least one master to one or more slaves positioned at various spatial locations. The method includes dividing the primary data signals into portions, transmitting/receiving at least some of the portions using different transmission configurations for the different portions, having one or more of the slaves develop a quality estimation signal, and processing the quality estimation signals to determine new values of the transmission parameters for use in transmitting/receiving the data signals.

Implementations of this aspect of the invention can incorporate one or more of the following. The quality estimation signals can be transmitted from the slaves back to the master, wherein the master performs the processing to determine new transmission configurations. The quality estimation signals can be transmitted from the slaves back to the master using transmission configurations associated with higher than average quality of transmission. Probe data signals can be transmitted using members of the potential configuration list. The probe data signals can be predetermined and known a priori by both master and slaves. The transmission parameters can include frequency, and the different values can be different frequencies. There can be a number of possible frequencies within a frequency band, and at any given time only a fraction of those frequencies can be listed on the preferred configuration list. The frequencies in use can be generally distributed across the frequency band. The data signals can represent audio signals. The audio signals transmitted can include music. The portions can be divided into subportions, each having an associated Cyclic Redundancy Check (CRC).

The method can also include error correction coding of the data signals in such a manner that at least some errors resulting from poor quality of transmission can be corrected without loss of the primary data. The data signals can be spread out in the time and frequency domains by interleaving. A plurality of different portions of the data signals can be error correction encoded, and at least some of the different portions of error correction encoded data signals can be transmitted using different transmission configurations (interleaved), so that if physical-layer errors result from poor quality of transmission associated with some of the transmission configurations, the errors can generally be de-localized (via de-interleaving) and correctable by error correction decoding at the slaves. Erasure techniques can be used in error correction decoding. The measurement of quality of transmission at the slaves can be based, at least in part, on error rate information derived from error correction decoding at the slaves. The transmission parameters can include at least one of the following: frequency, time, polarization, antenna directivity, antenna direction, antenna position, phase, signal power, equalization settings and modulation technique. The portions of the data signals can be of unequal size, so that more bits of data are transmitted using transmission configurations associated with higher quality of transmission. Higher order digital modulation can be used with transmission configurations associated with higher quality of transmission. The choice of new values of the transmission parameters can be done with at least some pseudorandomness. The choice of new values of the transmission parameters can be done in a nonrandom manner. The transmission can be performed using one of: FHSS (Frequency Hopping Spread Spectrum), DSSS (Direct Sequence Spread Spectrum), and OFDM (Orthogonal Frequency Division Multiplexing). There can be a plurality of masters each simultaneously transmitting to one or more slaves, with each transmission being done according to the method of the invention. The distance between the master and at least one slave can be at least 100 feet. Latency in the transmission from the master to the slaves can be less than or equal to 40 milliseconds. The method can operate in parallel with a wired network, and the wireless system can transmit the primary data signals while the wired network can transmit ancillary data signals. The data signal transmission can occur simultaneously with transmission from other electronic devices using transmission configurations interfering with those used for the primary data signal transmission, and wherein the processing is performed so that the transmission configurations chosen for transmitting the primary data signals avoid interference from the other electronic devices. The method can further comprise transmitting a system identification signal identifying the master, and can use the system identification signal at the slave to identify the master from which the slave desires to receive data signals. The quality estimation signals transmitted from the slave back to the master can be transmitted during a time slot assigned to the slave. The processing of the transmission quality estimation signals can comprise choosing transmission configurations that improve a criterion represented as a function of the transmission quality of all master/slave pairs. The new transmission configurations can be those that will produce a threshold level of transmission quality for all master/slave pairs. The new transmission configurations can be those that improve the transmission quality for the slave currently experiencing the lowest transmission quality. Information signals identifying the new configuration list can be broadcast to the slaves using greater error correction/detection coding than that used for transmission of the primary data.

In another aspect, the invention features a method of home audio communication for transmitting audio data signals from at least one master to one or more slaves located at long range from the master. The method can include using a short-range handheld remote unit to transmit data signals to a slave located within the short range of the handheld remote unit, receiving the data signals at the slave and relaying the data signals to the master using a long-range communication technique.

In implementations of this aspect of the invention, the relay of data signals to the master can be done using the data transmission technique of the first aspect.

In another aspect, the invention features a method for attaching a new slave to a wireless network having at least one master, the master communicating with the new slave using a set of frequencies from a range of available frequencies, the method comprising selecting a set of base frequencies from said range of available frequencies, using the set of base frequencies to send a packet containing a master timing reference signal and identification signal representative of the preferred set of frequencies, and receiving the packet at the new slave by tuning the new slave to one of the base frequencies and searching for a timing reference signal.

Implementations of this aspect of the invention can incorporate one or more of the following. Receiving can include alternately tuning the new slave to each frequency in the set of base frequencies. Searching for a timing reference signal can involve first setting up a direct current (DC) reference level in the slave so as to calibrate its circuits based on a DC reference level transmitted from the master.

Other features, objects and advantages will become apparent from the following detailed description when read in connection with the accompanying drawing in which:

DETAILED DESCRIPTION

Figure 1:
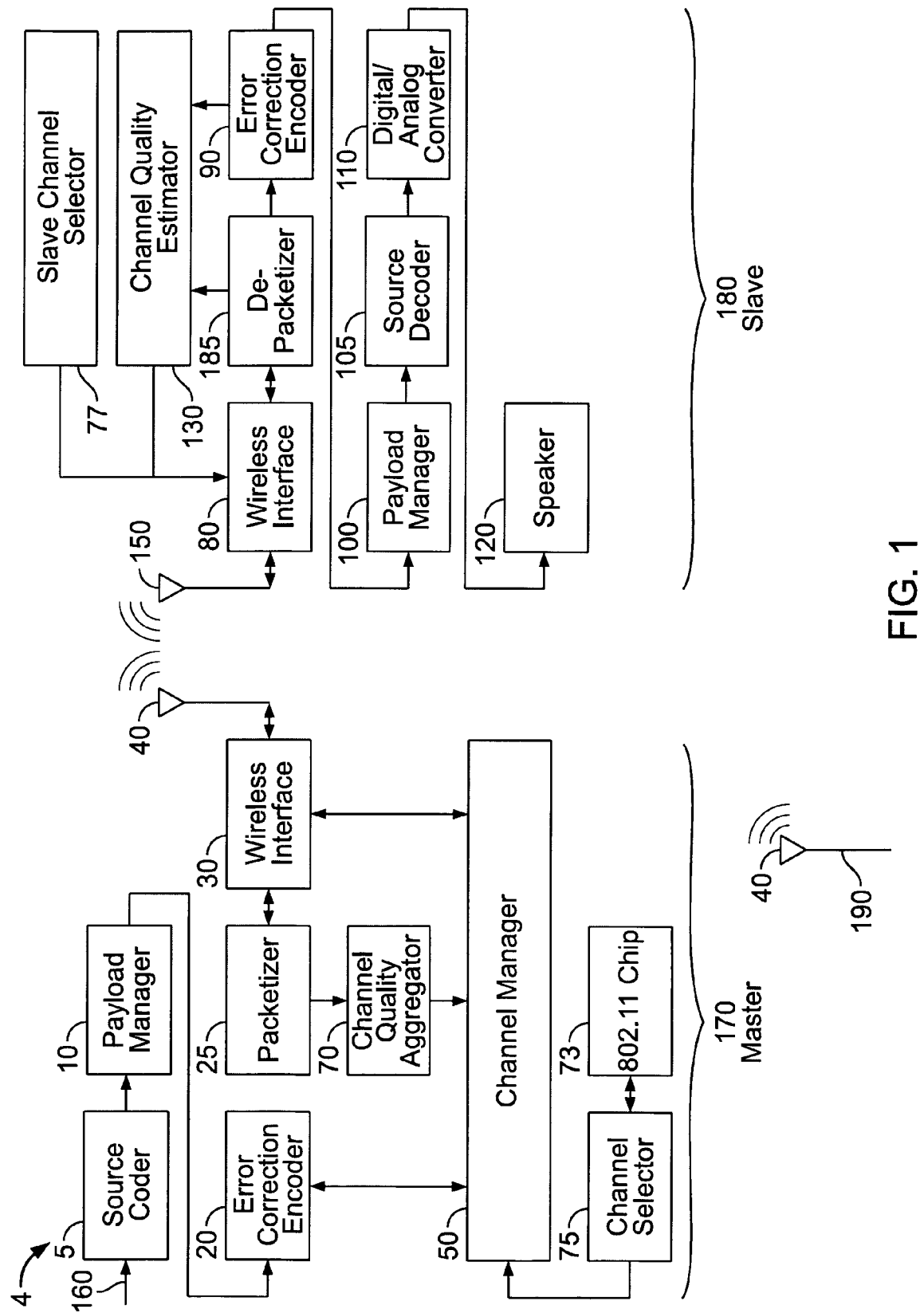
FIG. 1 shows a function block diagram of one implementation of the invention.

With reference now to the drawing, FIG. 1 is a block diagram illustrating the logical arrangement of a system 4 according to the invention. A master 170 communicates with at least one slave, such as slave 180, via a wireless medium (not shown). The system 4 is not limited to one master or one slave; multiple masters 170 can transmit to multiple slaves 180. For simplicity, the following description will be based on an example of one master 170 and multiple slaves 180. The slaves 180 are generally located in multiple distributed locations. The slaves 180 can be located in a plurality of rooms, each having a utilization device, such as a speaker, connected to it. While this specific example relates to a sound system, other applications are contemplated, such as video, multimedia, telemetry, and remote data gathering applications). The slaves 180 can be battery powered and/or portable, such as in a headset.

Information signals 160 to be transmitted from the master 170 to the slaves 180, such as digital audio information signals, are first processed by payload manager 10 to provide a data unit signal to be used as input to error correction coder 20, functioning to present information signals to a communication channel so as to reduce the channel's negative impact on data integrity. The master can further include a source coder 5 for providing compression (an audio compressor, for instance). A variety of techniques can be employed for audio compression: for example, Audio Layer 2 (AC2) compression as described in ISO/MPEG-1; AC3 Psychoacoustic masking and Redundancy reduction. For example, for 16-bit, 2 audio channel, 32.55 kHz audio information signals, the master can include a source coder, such as an apt-x coder from APT—Audio Processing Technology (headquartered in Belfast, N Ireland).

Figures 2A, 2B, 2C:
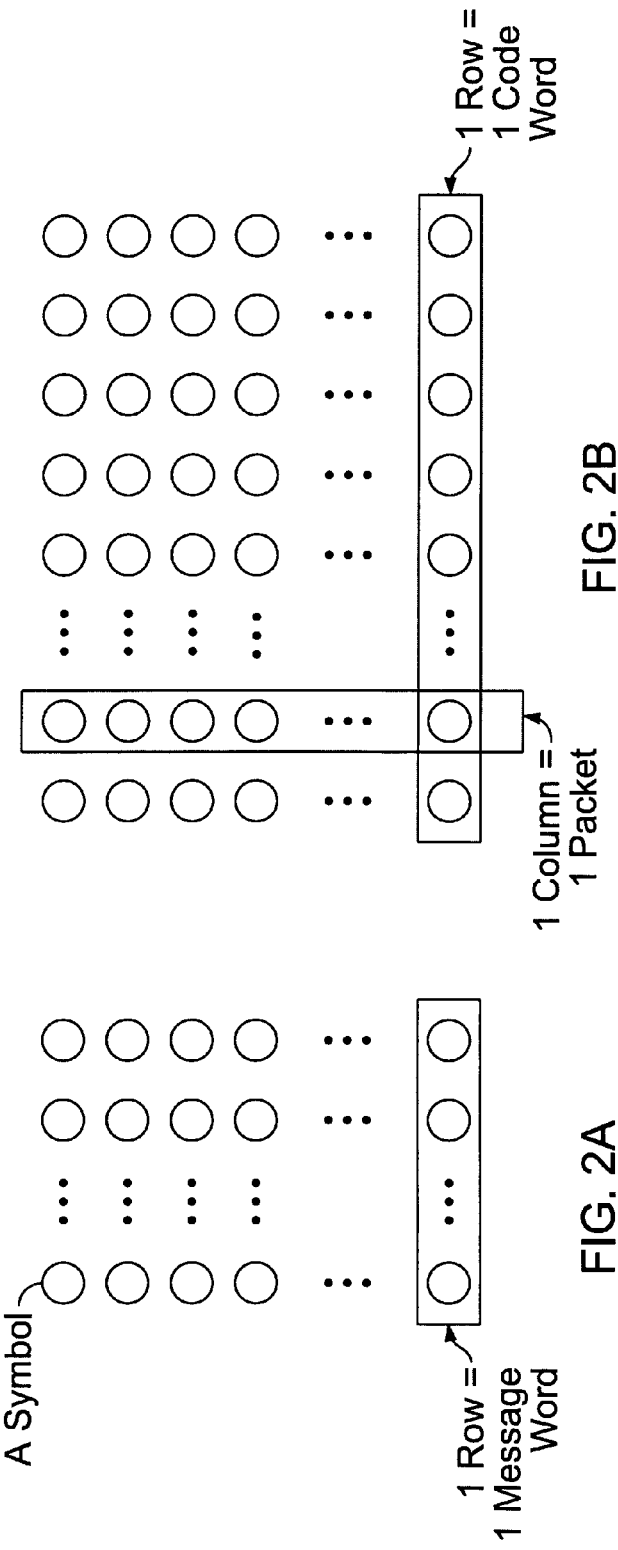
FIG. 2A shows the data signal structure from the output of the payload manager.
FIG. 2B shows the block structure from the error correction codec.
FIG. 2C shows a CRC protected packet structure.

The output from the Apt-x coder is organized by payload manager 10 into a data signal structure typically containing one hundred seventeen Message Words with six Symbols per Message Word and 4-bits per symbol in 2808 bits. This data signal structure can be represented by a matrix having six columns and one hundred seventeen rows, as shown in FIG. 2A. Each entry in the matrix is a symbol with 4-bits, and each row in the matrix is a "message word" (a unit of input to error correction encoder 20 which will be described in more detail below). The output from payload manager 10 along with some management bits (such as multiplexing control signals) can be protected using a channel coding technique such as error correction coding. The error correction encoder 20 maps a message word into a code word. Reed-Solomon (RS) coding can be used. For the exemplary RS coding in this example, the bit rate of the output from the error correction encoder 20 is doubled with respect to its input. The output of error correction encoder 20 (a block) can also be represented in the form of a matrix as shown in FIG. 2B. Each entry of the matrix is a symbol having 4 bits, and each row of the matrix is a code word composed of 12 symbols. For the exemplary audio signal, the block as output from error correction encoder 20 is a matrix having 12 columns and 117 rows. Each column of the matrix is defined as a packet having 468 (117×4) bits.

Error detection can be implemented by adding Cyclic Redundancy Checks (CRCs) or checksums into each packet after error correction coding. The CRCs can be distributed within the packet so that it is possible to tell not only if the packet contains an error, but also what part of the packet contains the error. Specifically, for the exemplary wireless audio home application, each packet is further divided into a number of (four, for this example) sub-packets (each has 117-bits), and a 4-bit CRC is individually calculated on each sub-packet (as shown in FIG. 2C). For the 4-bit CRC in this example, corrupted data will have a $\frac{1}{16}$ chance of falsely passing. The CRCs are further multiplexed by inserting each CRC close to the sub-packet it protects (either preceding or following the sub-packet). By doing so, the location of an error within a packet can be better located. The output from error correction encoder 20 is then processed by a packetizer 25. The output from packetizer 25 is transmitted to the slaves by the wireless interface 30 via one or more antennas 40.

From one transmission configuration to another, channel capacity can vary due to factors such as path loss, multipath interference, any interference other than the multipath interference, and nonlinearities. The system 4 can control how it uses the communication medium by changing its controllable transmission parameter values. The system 4 can in effect perform averaging over some or all of the controllable transmission parameters to compensate for localized channel capacity degradation. For example, localized channel capacity degradation can sometimes be caused by multipath interference which renders some pieces of spectrum unusable. If frequency is a controllable transmission parameter, the averaging can be achieved by sending the primary data over a sufficiently large number of frequencies and relying on error correction coding to repair the errors in packets sent over the affected spectrum.

Different transmission parameters are allowed to take on different values. For example, the frequency parameter can take on one value from the discrete set of radio frequencies that are tunable by the Phase Locked Loop (PLL). For the polarization parameter, the range of values can be the choice of vertical or horizontal polarization. The transmission quality achieved for a certain transmission configuration can be measured as the quality of the information signals received at the slave 180 (when the information is transmitted using the specified transmission configuration). The transmission quality can be quantified by many metrics such as Bit Error Rate (BER) which can be estimated based on information present in the error correction decoder and from the CRCs.

For the exemplary wireless application, the communication channel between a master 170 and slave 180 is the wireless medium with its associated multipath characteristics and interference sources. The controllable transmission parameter is the carrier frequency. The range of transmission parameter values depends on the selected frequency spectrum and channel bandwidth. For example, for an RF medium in the 2.4 GHz ISM (the Industrial, Scientific and Medical) radio band, the range of parameter values for the carrier signal control variable embraces all the tunable frequencies within the ISM radio band. The transmission configurations are the frequencies that can be adjusted by varying the transmission parameter value (carrier signal frequency, for this example). The following description is based on the exemplary wireless application.

Referring back to FIG. 1, a number of blocks (each containing multiple packets) from the output of error correction encoder 20 can be further processed and organized by packetizer 25 into a frame containing the blocks and management packets. The management packets will be described in more detail below. For the exemplary wireless application, eleven blocks from error correction encoder 20 and two management packets are organized into a frame having one hundred thirty-four packets.

The output from packetizer 25 is then transmitted via the wireless interface 30 using digital modulation techniques such as Frequency-Shift Keying (FSK), Quadrature Amplitude Modulation (QAM), Phase-Shift Keying (PSK), or Amplitude Shift Keying (ASK), from the master 170 to the slaves 180 using the 40 frequencies on the preferred frequency list. Since there are ninety-four tunable frequencies in the 2.4 GHz band, this choice leaves fifty-four frequencies on the potential frequency list. For this example, a frame contains 102.4 μs of audio data signals. A packet within a frame lasts about 750 μs. Error correction encoder module 20 can further perform interleaving in the time and frequency domains such that each symbol in a code word from the error correction encoder 20 is distributed to a different packet (as shown in FIG. 2B) to be transmitted on a different frequency from the preferred frequency list. The interleaving enables the error correction decoder 90 in the slave 180 to average the good quality of some packets with the poor quality of other packets such that the original information is accurately reconstructed. Interleaving can be performed over time, over frequency, or over any other controllable transmission parameter. Furthermore, each packet within a frame can be transmitted on a different frequency (transmission configuration in general)—in essence, introducing averaging in the frequency domain. A block as a whole is then transmitted over a representative portion of the available frequencies.

The system 4 is not limited to a specific form of source coder 5 and payload manager 10. The basic function of source coder 5 and payload manager 10 along with error correction encoder 20 and packetizer 25 can include dividing the information signals to be transmitted into a plurality of data signal units such as blocks for channel coding. The function can also include interleaving. The use of modules payload manager 10, error correction encoder 20 and packetizer 25 are for the purpose of illustration. These functional modules can be implemented in one or multiple physical units in the form of hardware or software. The invention is not limited to the specific source coder (such as Apt-x source coder in the exemplary implementation), specific structure of the data units (such as blocks and frames as illustrated) and specific error correction coder (such as RS coding in the exemplary implementation). The described data structures as shown in FIG. 2A and FIG. 2B are also for illustration purpose only.

Also shown in FIG. 1 is the slave 180 which can include one or more antennas 150 along with the wireless interface 80 for receiving the information transmitted from the master 170. The received information is fed to the depacketizer 185 and then to the error correction decoder 90. The depacketizer 185 and error correction decoder 90 perform essentially the inverse functions of packetizer 25 and error correction encoder 20. In the error correction decoder 90, each code word of every received block is checked for errors using the information inherent in the error correction coding, for example, the RS coding and the CRCs. The symbols in each code word will be flagged as correct or erroneous. If CRCs are present, they can be used to flag a group of symbols as "erasures" as is well known in the art of error correction coding. The transmission quality estimation provided by channel quality estimator 130 will be described in more detail later) is sent back to the master 170 via the wireless channel. The channel quality aggregator 70 in the master 170 collects this information for use by the channel manager 50 to select subsequent sets of frequencies (preferred frequency lists) used for transmitting primary data signals. The decoded information from error correction decoder 90 is sent to the payload manager 100. A source decoder 105 can be further provided for performing essentially the inverse function of source coder 5 for audio data signal transmission. The information signals can then go through the digital/analog converter 110 for the exemplary wireless application and be fed to the speaker 120.

The modules in the block diagram of FIG. 1, depicting the system 4, (e.g., source coder 5, payload manager 10 and channel manager 50, etc.), are logical modules that can be aggregated together in one or more physical modules, such as in the form of either hardware modules like ASICs and/or software modules.

The system estimates the channel transmission quality for both the preferred frequency list (preferred configuration list in general) and the potential frequency list (potential configuration list in general). The potential frequency list, for this example, can include all available frequencies (besides the 40 RF frequencies from the preferred frequency list) selected from the 2.4 GHz ISM frequency band. Although this detailed description focuses on the exemplary wireless application, the system 4 has broader applicability, and is not limited to a single controllable transmission parameter but is applicable to multiple controllable transmission parameters, including but not limited to time, frequency, wavelength, polarization, antenna directivity, antenna direction, antenna location, equalizer settings, chipping sequence, signal power, and signal phase. In general terms, the system monitors the transmission quality for the preferred configuration list which will be used for transmitting primary data signals, and the potential configuration list which is not expected to be used for transmitting primary data signals in the immediate future.

Referring back to FIG. 1, each one of the slaves 180 develops its own transmission quality estimation in 130 by keeping track of the symbol-error information determined in its error correction decoder 60 for the preferred frequency list. For the potential frequency list, estimation of the transmission quality can be done by sending a probe packet containing data signals known a priori by both the master 170 and the slaves, such as slave 180. The probe packets are transmitted on probe frequencies selected from the potential frequency list. The transmission quality for the probe frequencies is estimated in each slave by measuring, such as the BER, of the received probe data. The probe frequencies are not currently-in-use, but the master 170 needs to know their transmission quality so that they can be used as candidates along with the preferred frequency list when the system 4 selects subsequent preferred frequency lists for transmitting subsequent primary data signals. The set of probe frequencies can include all or a subset of the frequencies from the potential frequency list. The transmission quality estimate for both the set of 40 frequencies on the preferred frequency list and the set of probe frequencies can be sent back to the master in a feedback packet. Due to a variety of phenomena, such as multipath interference, each one of the set of 40 frequencies can behave differently in terms of transmission quality. One advantageous choice of frequency for transmitting the feedback packet is the frequency from the preferred list which has the highest transmission quality, although many other choices, such as alternately using frequencies having higher than average transmission quality are also possible.

To improve performance, frequency (transmission configuration in general) adaptation is used. The master collects the feedback data signals from all of the slaves and aggregates its own transmission quality estimate. The master then periodically adjusts the preferred frequency list (or in general, the preferred configuration list) for the subsequent primary data signals. There are many different ways in which the master can aggregate the transmission quality information from the slaves 180 and select the subsequent preferred frequency list. For instance, it can simply average the estimate reported by each slave 180 for each frequency. The master 170 can also use the transmission quality information from each slave 180 to estimate the quality of the link to each slave 180, and then make decisions about which frequencies to use in the future based on the needs of a slave 180 which is closest to failure. In general, the master 170 can process the transmission quality measurements and select the subsequent preferred frequency list which improves a function of the transmission quality of all master/slave pairs. Based on the transmission quality estimation and how the master 170 selects the subsequent preferred frequency list, the preferred frequency list can not need to be adjusted, or the adjustment (from current preferred frequency list to subsequent preferred frequency lists) can be pseudorandom, partially pseudorandom or the adjustment can be nonrandom.

Information about the selected subsequent preferred frequency list is included in the network management information which can be transmitted to the slaves 180. To improve reliability of transmitting this information, the network management information can be further protected via error correction coding, which can be more certain of correction than that used to protect the primary data, along with the use of CRCs. Further, instead of sending the network management information once, during the transmission of a frame, the network management information can be transmitted multiple times. For the exemplary wireless audio application, since each frame contains 11 blocks, the network management information can be transmitted along with every block of data so the slaves will have 11 opportunities to receive it.

Figure 3:
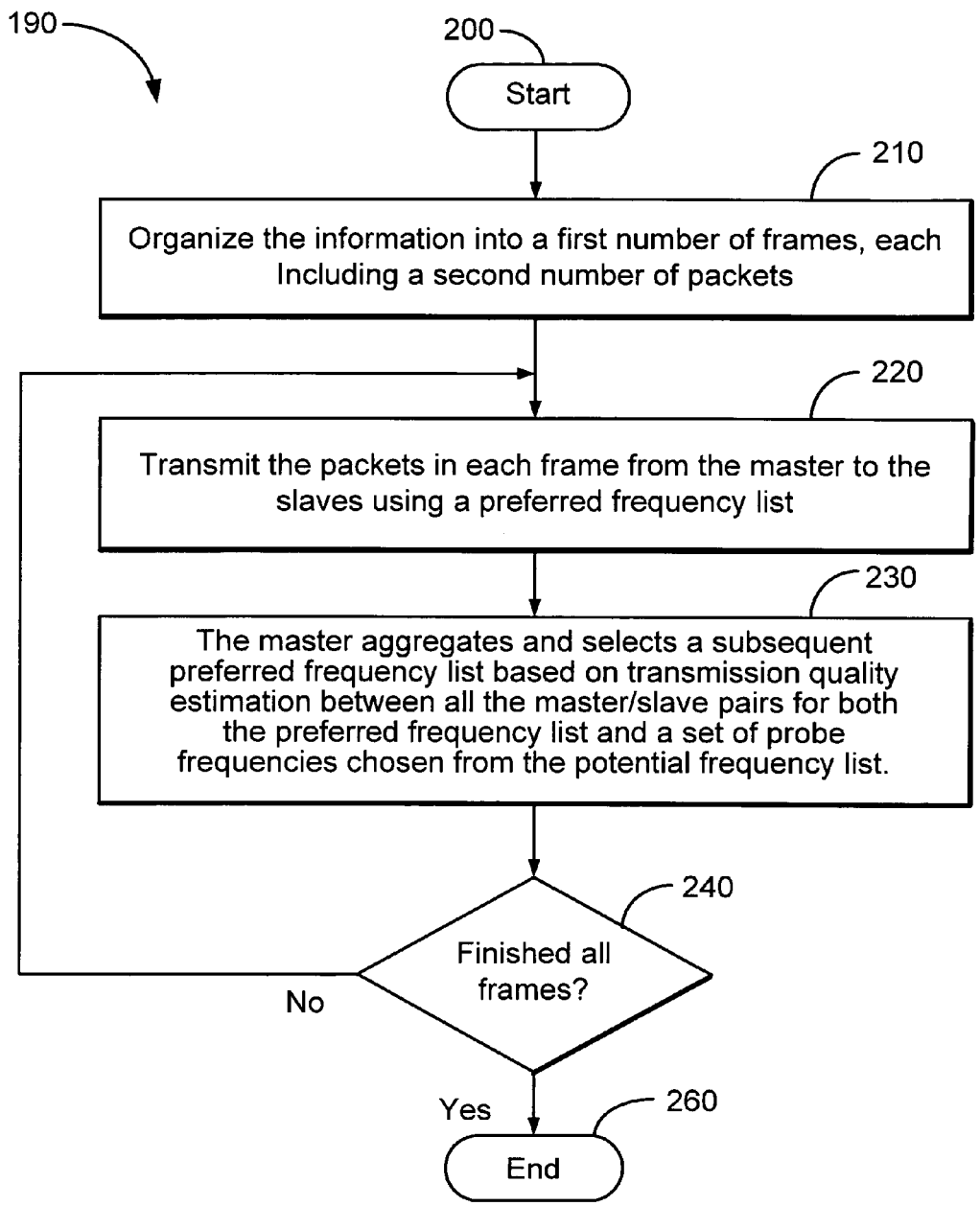
FIG. 3 shows the flowchart of system operation procedure of one implementation of the invention.

FIG. 3 shows a flowchart operation procedure 190 of the system 4. The system start 200 organizes information signals into a first number of frames, each including a second number of packets 210. Each frame is transmitted from the master 170 to the slaves 180 by sending 220 the packets within the frame via a preferred frequency list. The master 170 aggregates and selects a subsequent preferred frequency list based on transmission quality estimation between all the master/slave pairs for both the preferred frequency list and a set of probe frequencies chosen from the potential frequency list 230. The procedure 190 continues until all the frames are sent 240.

An adaptive scheme, which utilizes the transmission quality estimation, can be used along with a number of technologies for transmitting the digitally modulated information, e.g., FHSS, DSSS, and OFDM (selecting appropriate RF spectrum and digital modulation schemes), by adaptively adjusting one or more controllable transmission parameters. For example, in the case of frequency hopping (FHSS), the master 170 sends a short burst of data signals (a packet for the exemplary wireless sound system) via a digital modulation technique such as 4-level frequency shift keying (4-FSK) or quadrature amplitude modulation (QAM), then adjusts the frequency and sends another short burst of data signals. Each frequency is occupied for a brief period of time. The preferred frequency list can or can not be adaptively adjusted, based on transmission quality estimation and how the master 170 selects the frequencies, to accommodate the localized channel capacity variation. When the proposed transmission quality based adaptive scheme is used with direct sequence modulation (DSSS), the system 4 can take various actions based on transmission quality information, including switching to a new center frequency having better transmission quality, adjusting the chipping sequence, or changing other variables that can affect the transmission, such as antenna polarization, power level, and time slot. When the slaves 180 are handsets, the handset transmission power can also be adjusted so that signals of all handsets have the same power arriving at the master 170.

In general, the monitored channel transmission quality information can be used in many different ways to improve system performance in addition to the adaptive adjustment of frequencies (transmission configurations in general) described above. For example, the properties of digital modulation can be adjusted based on monitored transmission quality. For a frequency having better quality, a higher order modulation scheme such as 16-QAM could be used, while for a frequency having poorer quality a lower order modulation scheme such as 4-QAM could be used, so as to equalize the BER on the frequencies.

The information signals 160 to be transmitted can include more than one stream of information signals simultaneously. For example, for the exemplary wireless sound system, there can be two streams from two separate audio signal sources (e.g., one might be carrying a radio broadcast while the other carries material from a CD player), allowing people in different rooms to listen to sounds from different audio signal sources simultaneously. The multiple streams can be separately coded and transmitted via separate masters, and the slaves will then choose to connect to one of the available masters. Alternately, the multiple streams can be multiplexed into the transmission of a single master. For the case when more than one stream is transmitted, the error correction coding scheme of coder 20 can also be adjusted based on the transmission quality and/or utilization of received streams (such as based on slave 180 status and user command/control for each stream). For example, when one stream is not used, an error correction scheme of coder 20 more certain of error correction can be used for the other stream. Furthermore, one embodiment can pack two of the masters 170 into a single physical unit, with each master 170 dedicated to a separate audio signal source (e.g., one for a radio broadcast, and the other for a CD player). They can share common components, such as a common power supply. Also, two masters 170 can be wire-connected in order to synchronize their transmissions and share preferred frequency lists. Two masters 170 that are so implemented are preferably synchronized so that they can listen for feedback packets at the same time. They can also coordinate their selection of frequencies to avoid transmitting on the same frequency at the same time.

The master 170 and the slaves 180 preferably agree on which frequencies (transmission configurations in general) will be used, especially for a broadcast network when either a new slave 180 or an existing slave 180 which lost synchronization with the network (e.g., due to interference), must be able to acquire the network (know which frequencies will be used for the next frame of data and synchronize its own time base with that of the master 170), without disturbing any ongoing transmission to other slaves 180. A set of predefined "base frequencies" can be used by the master 170 to transmit the information about the current preferred frequency list to the slaves 180, and the information used by a new slave 180 for acquiring the network. The set of base frequencies is known a priori by both the master 170 and the slaves 180, including the slave 180 to be attached. At a predetermined rate, the master 170 can transmit a "sync" packet on one of the base frequencies. The sync packet includes a timing reference extracted from the master's local clock (for instance, a local crystal oscillator) and the current preferred frequency list. When a new slave 180 is turned on, the slave 180 tunes to one of the base frequencies. The slave 180 repeatedly tries to receive the sync packet, and moves on to another one of the base frequencies, until it succeeds. The slave 180 then reads in the data and the CRC. If the CRC fails, the slave 180 resets itself and tries again. If the CRC passes, the slave 180 assumes it has acquired a master. The new slave 180 then receives packets from the master 170 until such time as the new slave 180 detects a loss of synchronization.

Figure 4A:
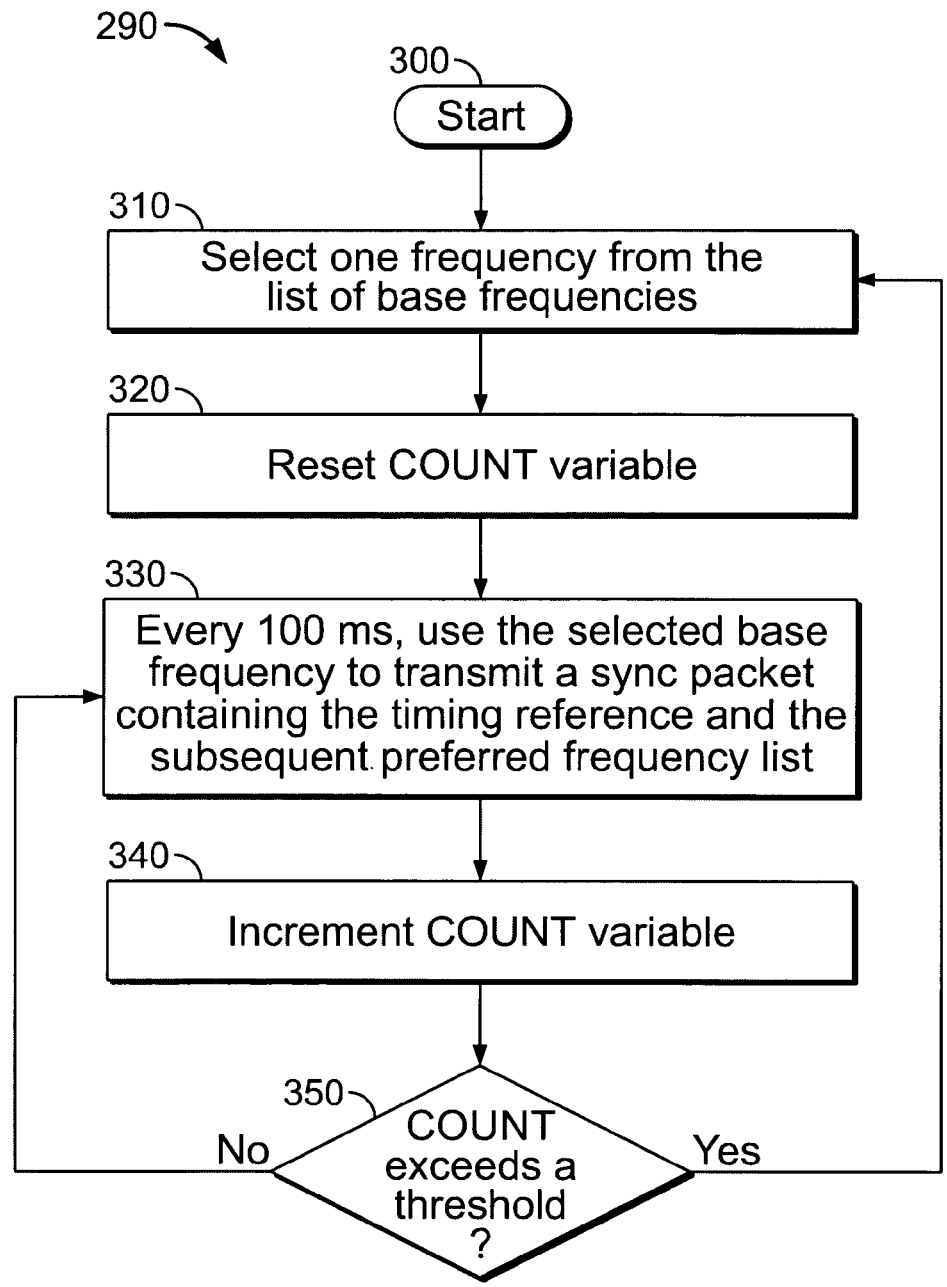
FIG. 4A shows the flowchart of operation procedure for network acquisition at the master.

FIG. 4A shows a process 290 for network acquisition at the master 170. The process 290 start 300 selects one frequency from the set of preselected base frequencies 310 to be used for acquiring the network by the new slaves 180. A COUNT variable is then reset 320. Periodically (every 100 ms for example) the master 170 transmits a sync packet containing the master's timing reference and the subsequent preferred frequency list on the selected base frequency 330. The COUNT variable is incremented 340. If the COUNT variable is larger than a predetermined threshold value 350, the procedure switches to select one frequency 310 to pick another frequency from the list of base frequencies. Otherwise the master 170 transmits the sync packet on the same selected base frequency. When the master 170 is not transmitting a sync packet (which is most of the time), it sends other packets containing other data signals.

Figure 4B:
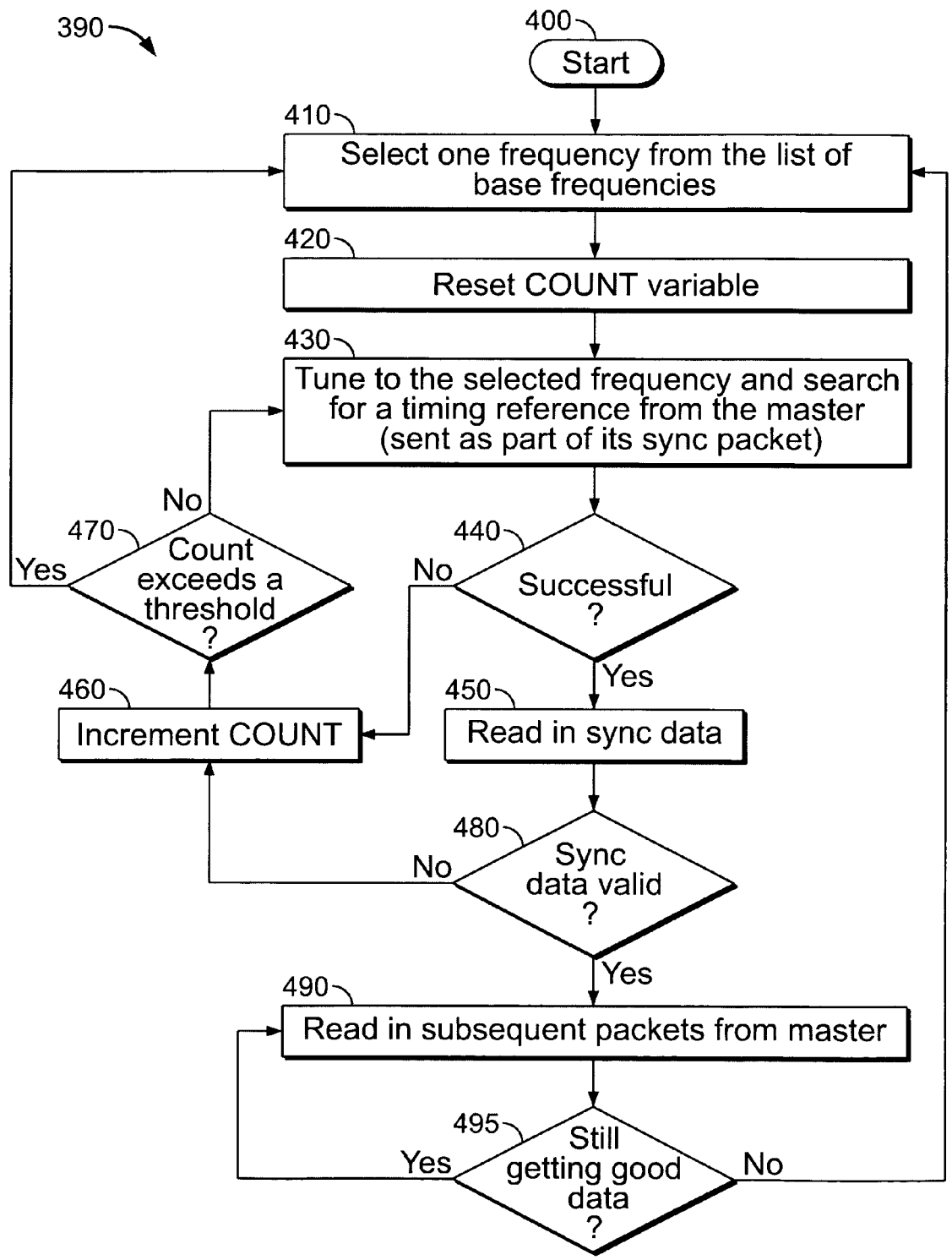
FIG. 4B shows the flowchart of operation procedure for network acquisition at the slave.

FIG. 4B shows a process 390 for network acquisition at the slaves 180. The process 390 start 400 selects one frequency from the set of preselected base frequencies 410 to be used for acquiring the network by the new slaves 180. A COUNT variable is then reset 420. The new slave 180 seeking a master 170 for attachment tunes to the selected frequency and searches for the timing reference information 430 sent as part of the sync packet. If it succeeds, the process reads in the synchronization data 450. Otherwise the COUNT variable is incremented 460. If the COUNT variable is larger than a predetermined threshold value 470, the process switches to select frequency 410 to select another frequency from the list of base frequencies. Otherwise, the procedure returns to 430 so the new slave 180 will continue trying to find a sync packet on the same base frequency. After reading the synchronization data 450, its CRC is checked for validity 480. If synchronization data is valid, synchronization has been achieved. The new slave 180 reads in subsequent packets 490. Otherwise, the procedure returns to 460 to seek synchronization data again. After step 480, the new slave receives primary data packets. If the received primary data packets are consistently incorrect 495, the process returns to 410 to try to acquire the network again.

FIGS. 5A-5E are exemplary schematic circuit diagrams suitable for use as a master 170 or a slave 180 with actual parameter values when including the machine-readable software in the accompanying CD. This circuitry can be connected as a master 170 and receive stereo signals from a source, such as a CD player or tuner, and function as a slave 180 that furnishes appropriate audio signals to a loudspeaker system.

The probe packet, feedback packet, and sync packet are a few possible management packets that can be implemented. The packet structure of such management packets can be the same as or different from the packet structure used for data signal transmission. An exemplary implementation of the invention accommodates one feedback packet per frame, with probe packets and sync packets each being sent every other frame.

The wireless system 4 can operate alone or in parallel with other types of existing networks such as Ethernet networks. For example, the wireless system can be used to transmit time critical data (e.g., audio signal streams) while the existing network is used to transmit other data signals (e.g., command/control signals).

An advantage of the wireless system 4 is that it can successfully operate in the presence of noise and competing data signal transmissions in the same transmission band (e.g., from microwave ovens, cell phones, wireless telephones, and other audio devices). For example, interference from microwave ovens, which can be a serious impediment to wireless data signal transmission in homes, is inherently rejected by the system's monitoring of transmission quality—frequencies affected by microwave oven are discovered and avoided. Competing wireless data transmissions are also, to a degree, dealt with in the same manner; and additional immunity to such competing transmissions arise by choosing sets of frequencies that have little overlap with the frequencies used by competing systems (e.g., the frequencies used in a frequency hopping implementation could be orthogonal to those of a competing system).

Each master 170 in the system can also be assigned a unique identification signal that can be transmitted to slaves 180 in the same system to condition the slaves 180 to receive correct data signals. Management packets returned by slaves 180 to masters 170 can be sent during time slots assigned on the basis of a slave's unique identification signal.

The system 4 is sufficiently reliable to provide a multiroom home wireless audio system with a range (distance between master and slaves) of more than 100-ft, as many as eight slaves; a latency (time delay between master and slaves) of less than 40 ms, excellent audio quality, and ability to accommodate transmissions from at least two independent audio signal sources.

The auxiliary data signals, such as command/control signals from the slaves can also be sent back to the master along with, or separate from, the transmission quality estimation information signals via the same or separate frequency. For example, for the exemplary wireless sound system application, the user can want to change the audio signals transduced by the speaker, such as by changing the FM radio station. For this example, the relatively long-range wireless link (up to more than 100 ft for the exemplary application) can operate beside short-range RF remote controls, with which the user can command the specific audio devices (e.g., changing the FM radio station). The user's command/control information can be relayed from the short-range RF remote to the master located at the other end of the long-range wireless link. When the RF remote operates in a different frequency spectrum from the wireless data transmission, the slaves where the audio device is connected can have an RF remote transceiver included so that the command/control to/from the RF remote can be passed through the long-range wireless link in the same way that ancillary information signals are transmitted. Essentially this arrangement forms a repeater for the short-range RF remote, enabling RF remote operation in the same area served by the long-range wireless link.

Figures 1, 5A:
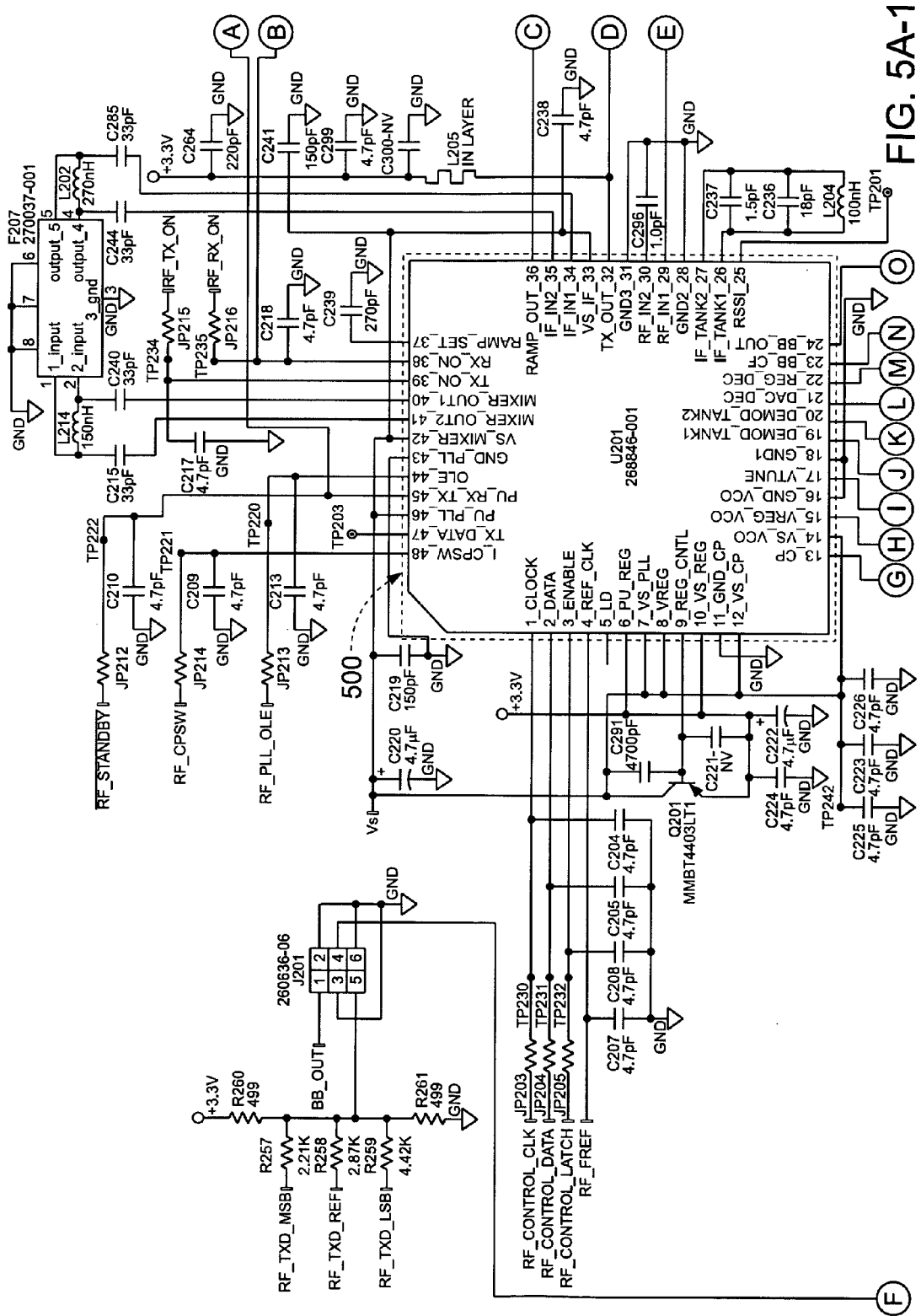
FIGS. 5A-5E are schematic circuit diagrams of an exemplary embodiment of the invention.
Figures 2, 5A:
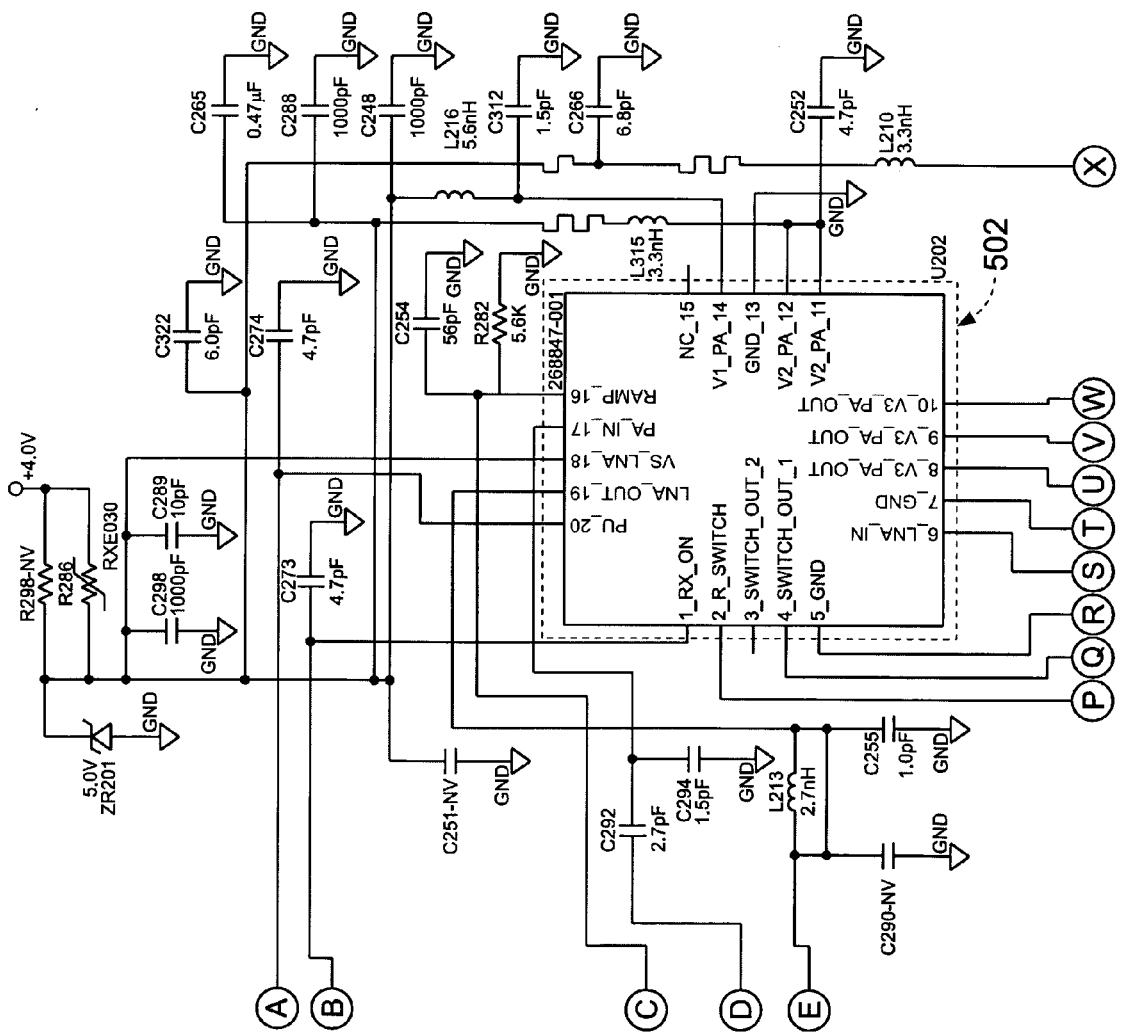
Figures 3, 5A:
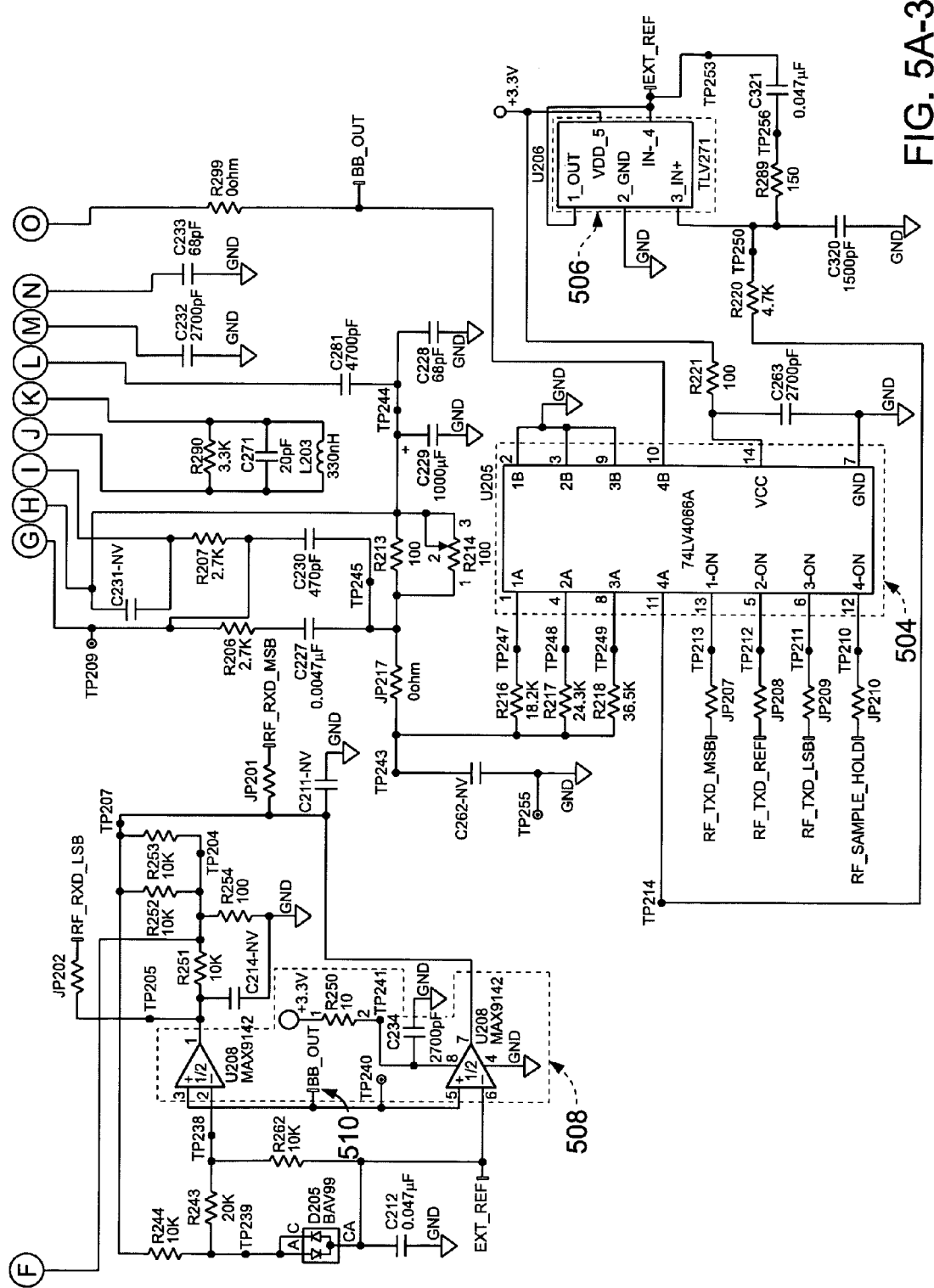
Figures 4, 5A:
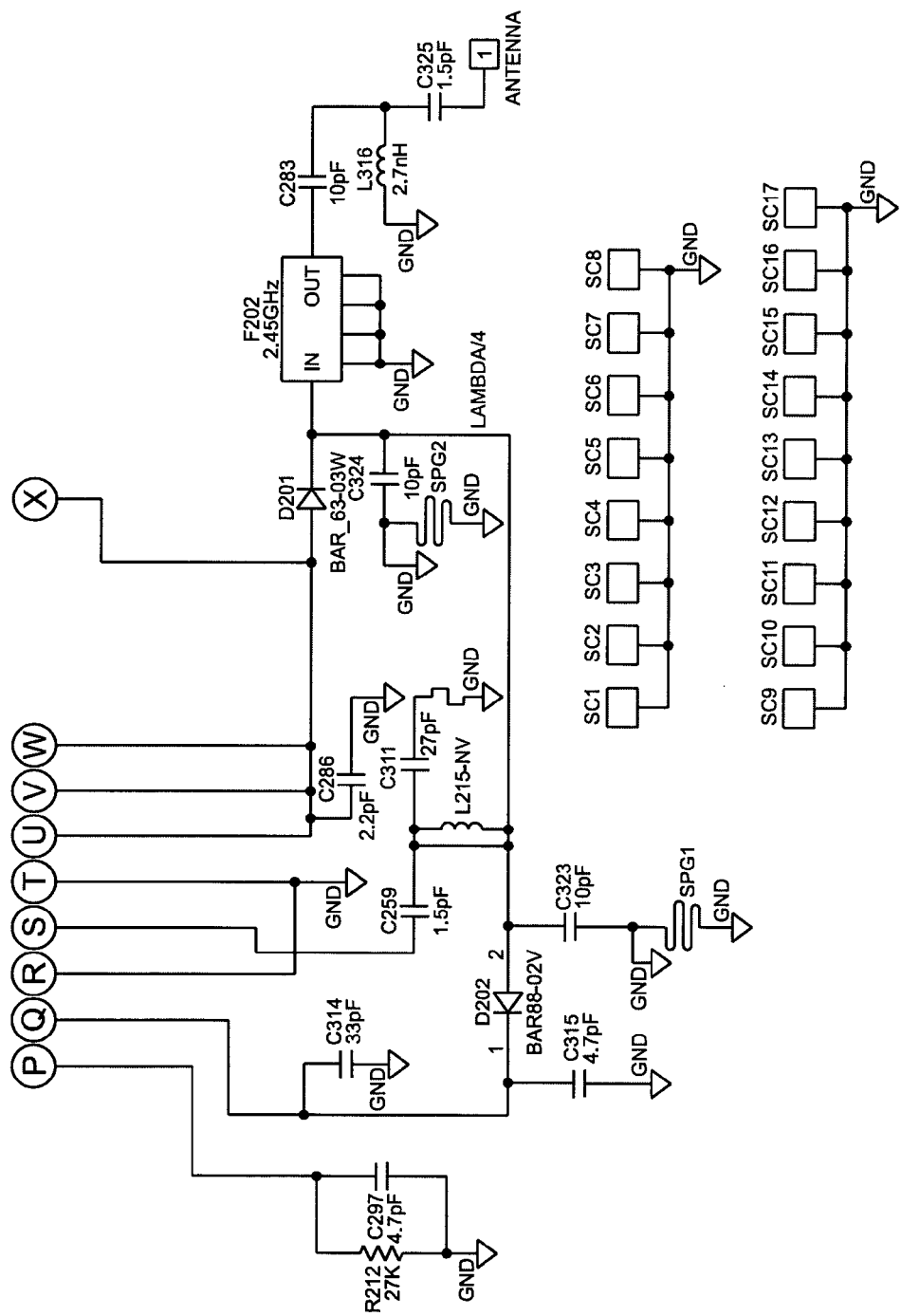

FIG. 5A includes a transceiver chip 500 commercially available from Atmel Corporation of San Jose, Calif. For transmission, the chip 500 receives a base band signal and FSK modulates this signal on a carrier in the 2.4 Ghz band tunable by a PLL on the chip. A digital interface receives appropriate signals for controlling the carrier frequency and other parameters. For reception, the chip 500 receives a signal in the 2.4 Ghz band, converts the signal for filtering, and then demodulates it to a base band signal delivered at 510. Chip 502 can be regarded as a sibling chip of transceiver chip 500. For transmission, it functions as a power amplifier, delivering as much as a few hundred mw of power for radiation of a modulated carrier in the 2.4 Ghz band. For reception, it includes a low noise amplifier.

A chip 504 is an analog switch that functions primarily for modulation and is commercially available from Atmel accepting two-level FSK modulation, and with supporting components, furnishes four-level FSK modulation. A chip 506 functions as an operational amplifier that coacts with one of the switches in analog switches 504 as a sample/hold circuit. This circuit accepts a reference level from an incoming analog signal at 510 so that the following circuitry can correctly differentiate one level from another to negate the effects of any DC bias in the incoming signal.

A data slicer 508 coacts with surrounding components to convert the analog signal at 510 into a digital signal that can be sampled.

Figures 1, 5B:
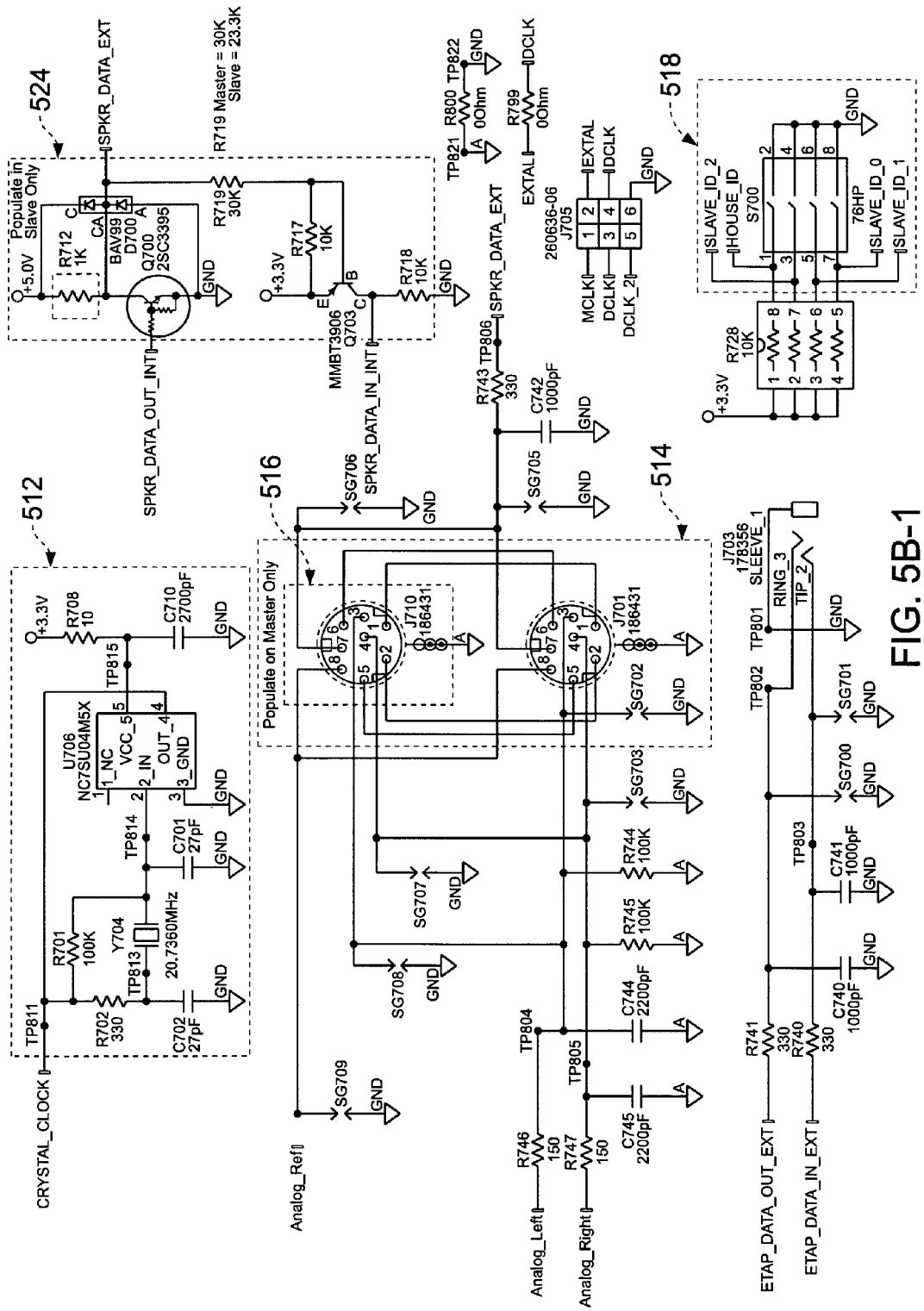
Figures 2, 5B:
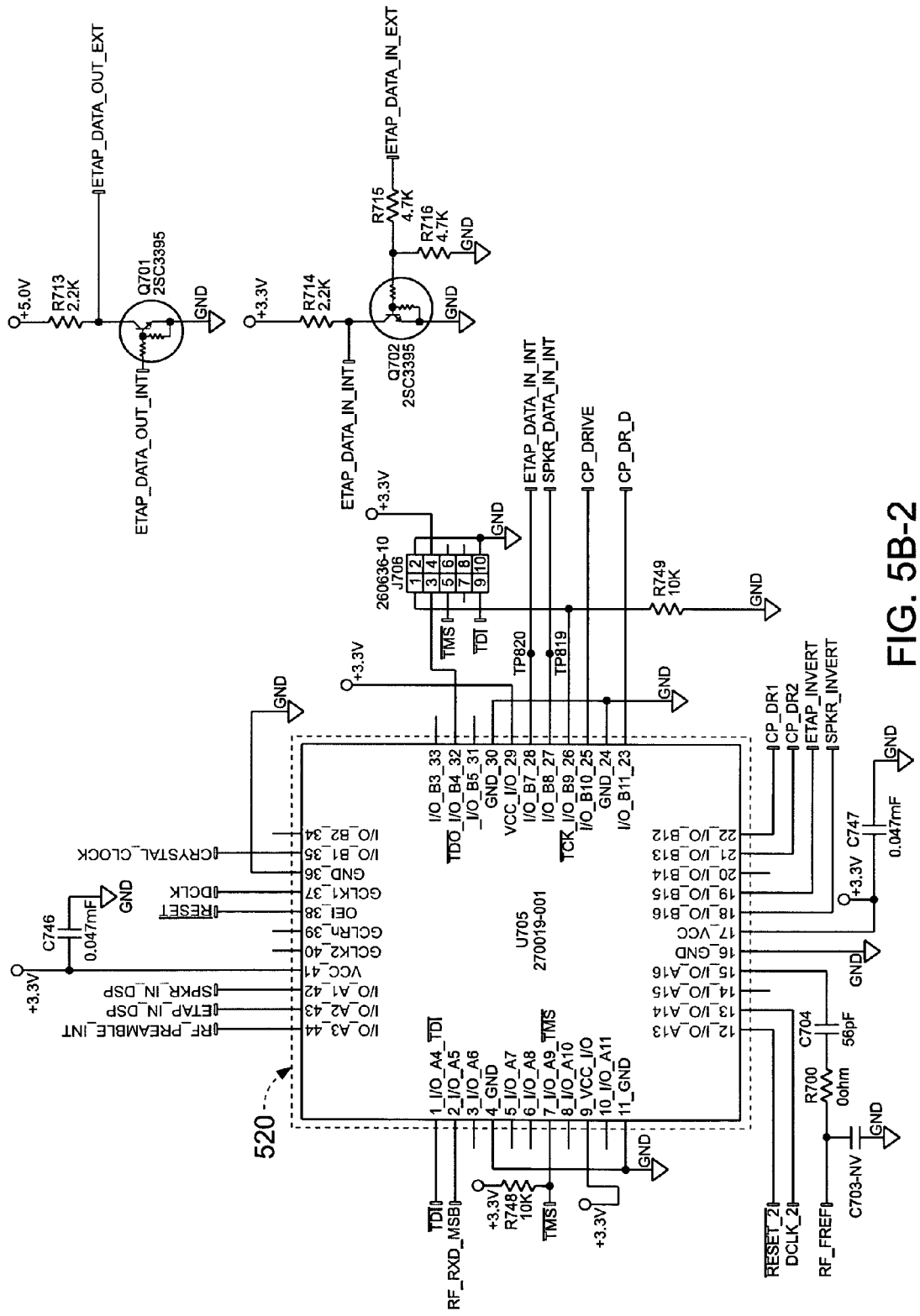

Referring to FIG. 5B, an oscillator 512 functions as the primary time base for furnishing timing signals to all other circuits in the embodiment. An analog audio interface 514 receives left and right stereo signals when the embodiment functions as a master, and a socket 516 is only populated when operating as a master. Switch bank 518 allows a user to select the identification signal for the specific master 170 or slave 180.

Programmable logic device (PLD) 520 can be an EPM3032ATC44-10 commercially available from Altera of San Jose, Calif. The device 520 handles many low-level digital signal functions that are relatively easily handled with programmable logic. The device also performs the preamble detection. When the PLD detects a given pattern in the incoming signal (the preamble), it fires an interrupt signal which the digital signal processor uses as a timing reference. The machine code executable on programmable logic device 520 is ProgrammableLogicChip.pof on the accompanying CD.

When used as a slave 180, the master/slave interface can include these voltage translation transistors.

Figures 1, 5C:
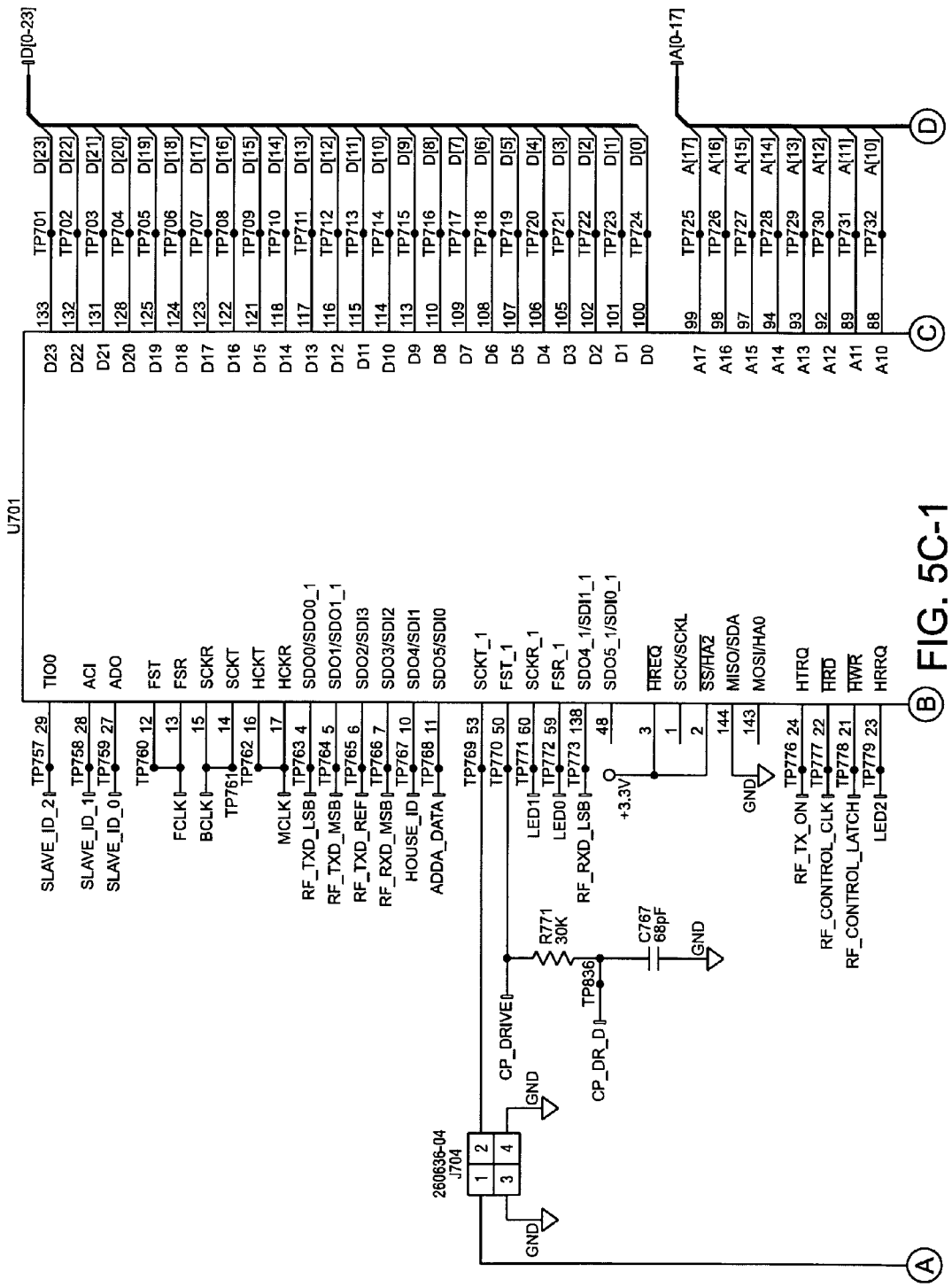
Figures 2, 5C:
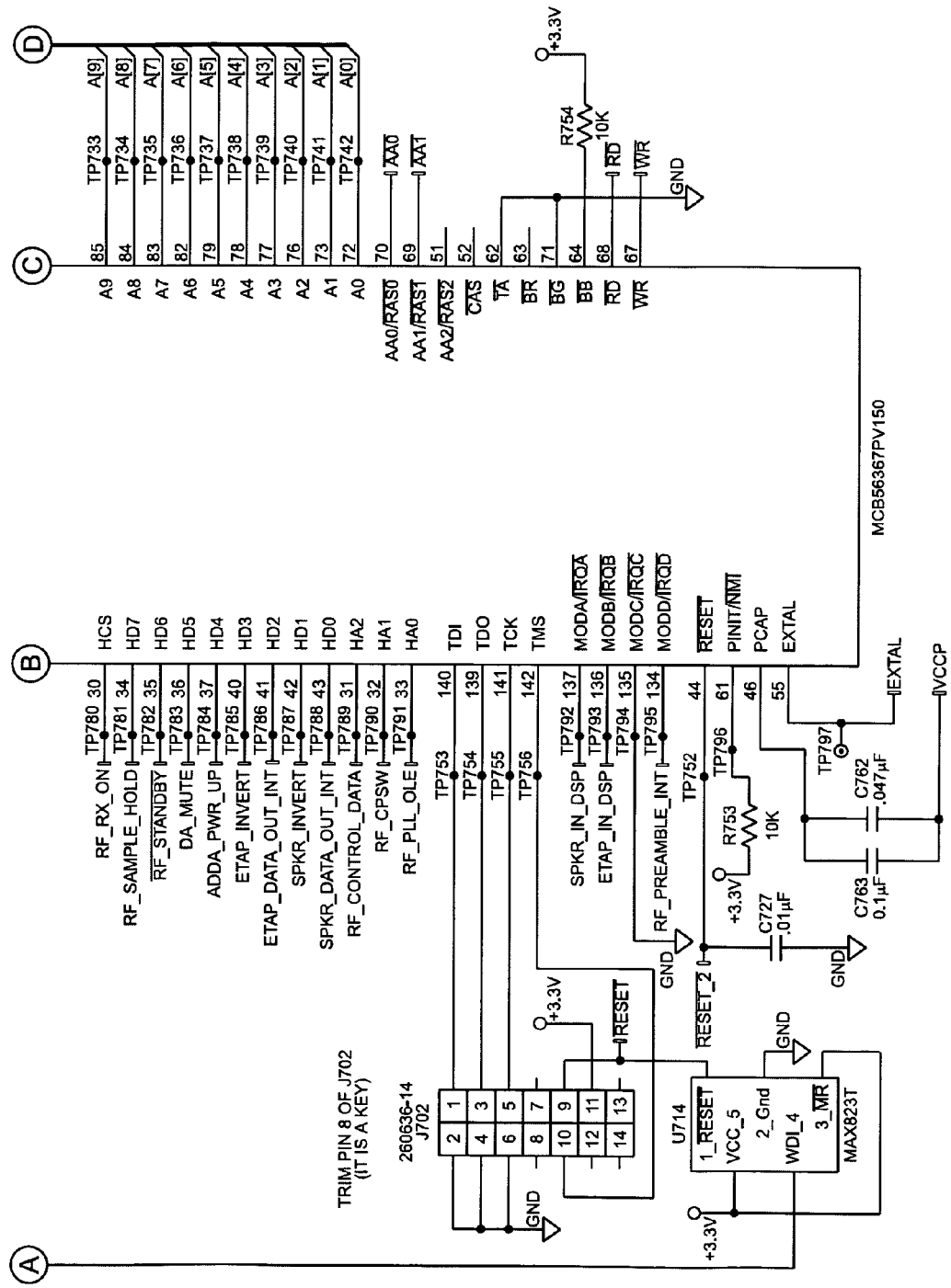
Figures 3, 5C:
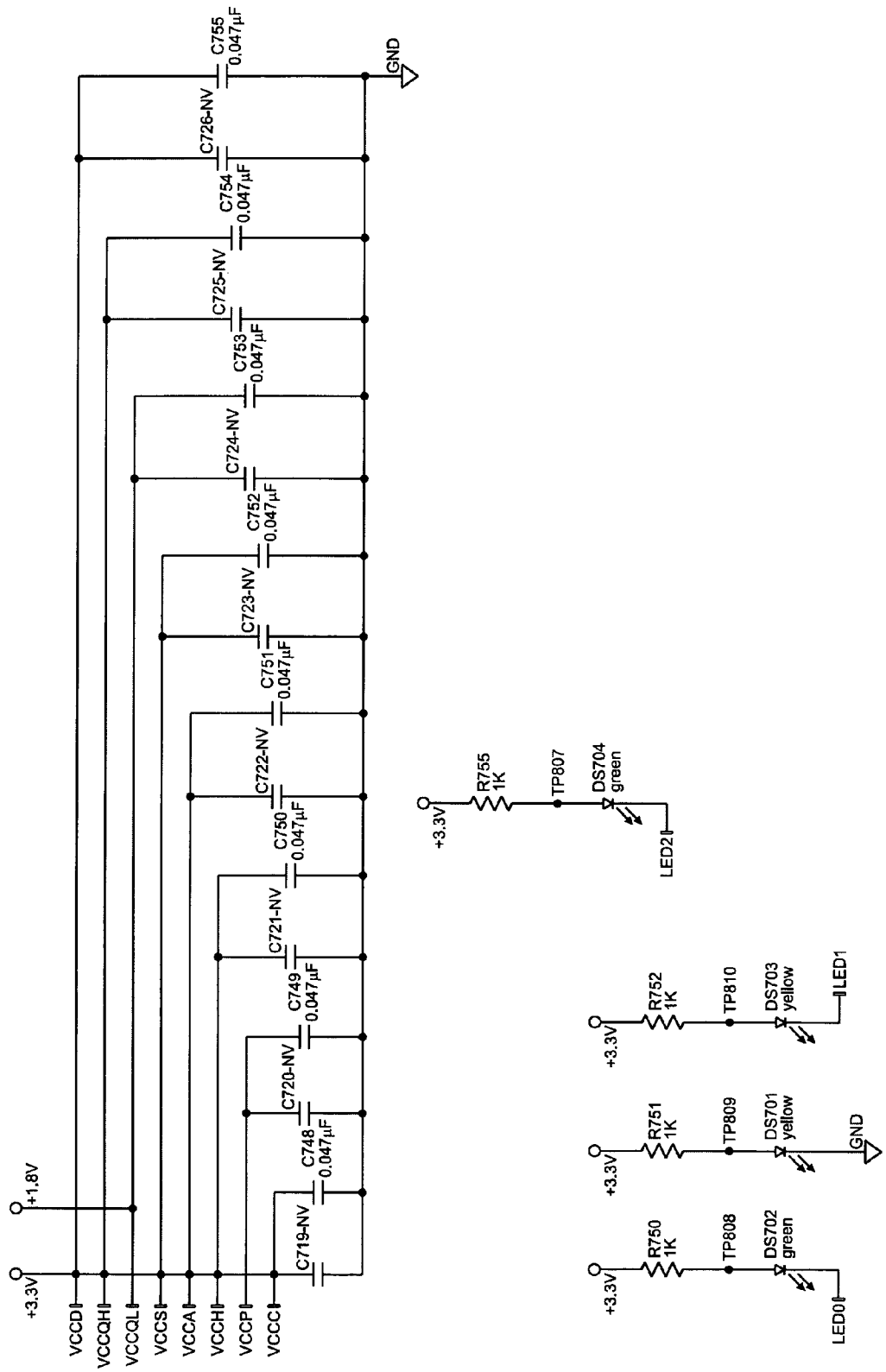
Figures 4, 5C:
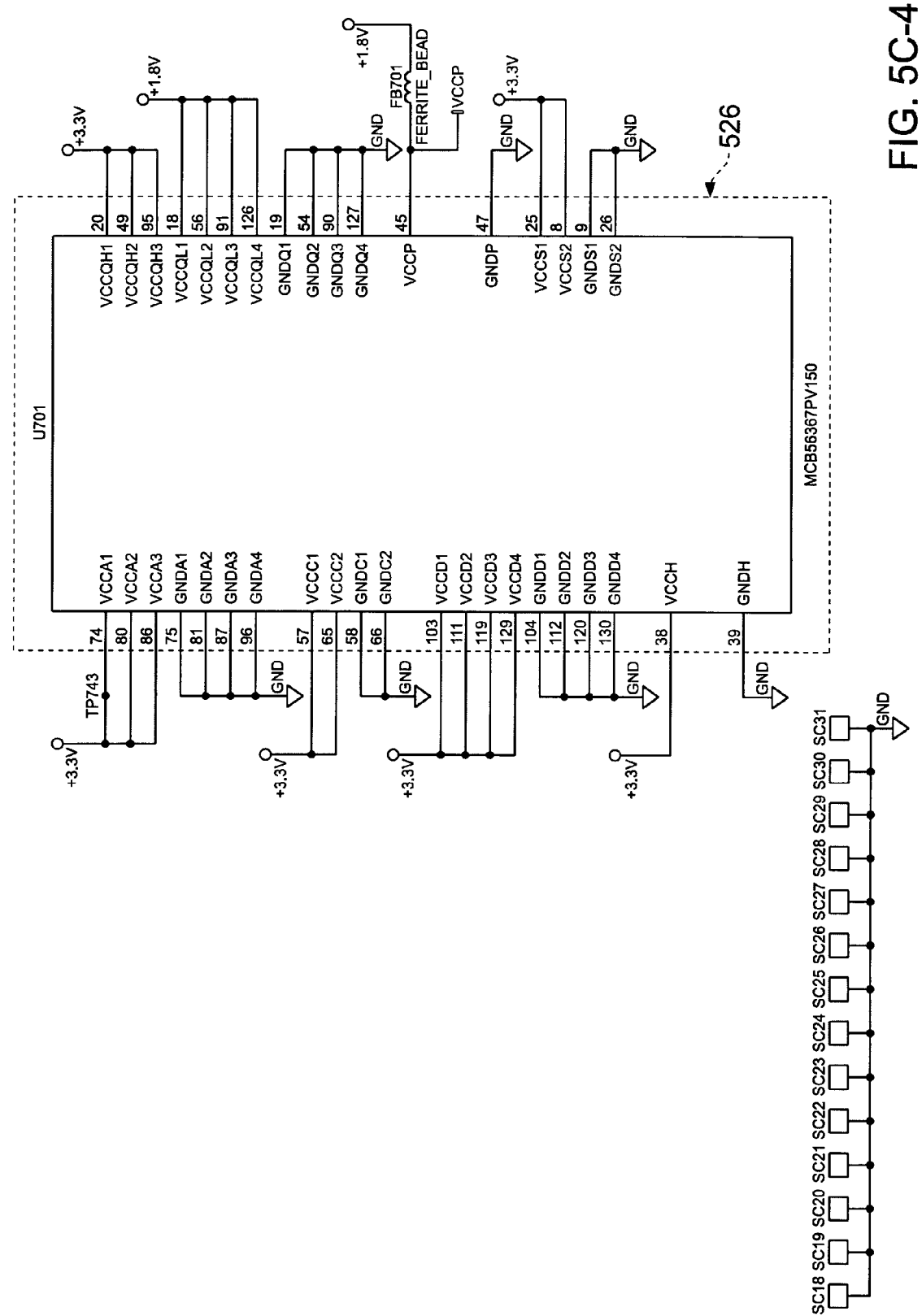

Referring to FIG. 5C, a digital signal processor 526 performs the methods according to the system 4. This digital signal processor in this exemplary embodiment is a 180-MIPS Motorola chip (Motorola DSP56367) commercially available from Motorola. The machine codes executable on this chip are MASTER.BIN for the master and SLAVE.BIN for the slave on the accompanying CD.

Figure 5D:
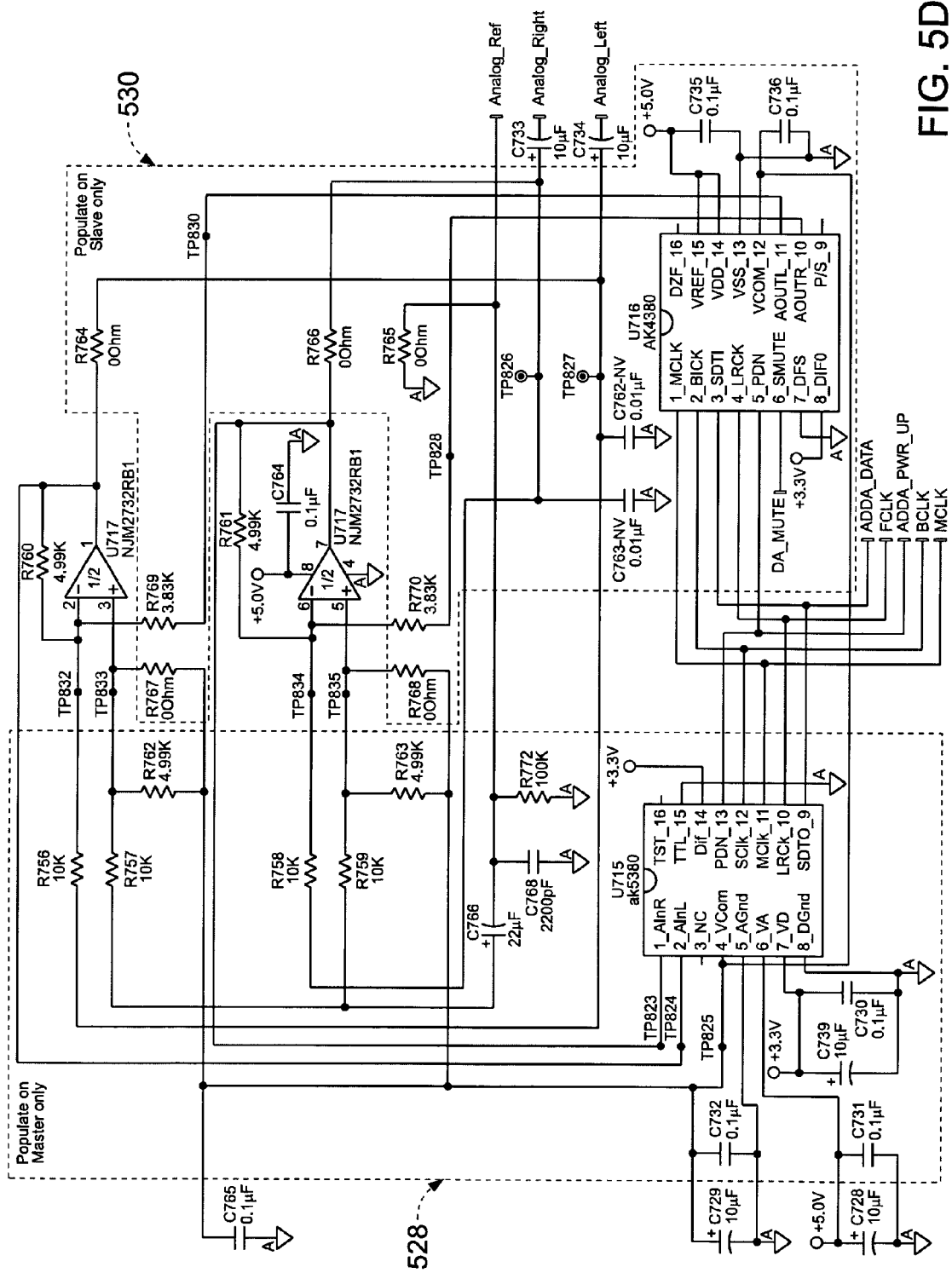

Referring to FIG. 5D, there is shown circuitry performing analog audio signal processing. For master 170, circuit 528 includes a differential pre-amp followed by an A/D converter. The master 170 is capable of taking two analog streams (of two channels each), two pairs of differential amplifiers and two dual analog-to-digital converters. For slave 180, circuit 530 has a single (dual) digital-to-analog converter followed by a pair of buffered amplifiers. Only one stream of two channel output is furnished for this example.

Figures 1, 5E:
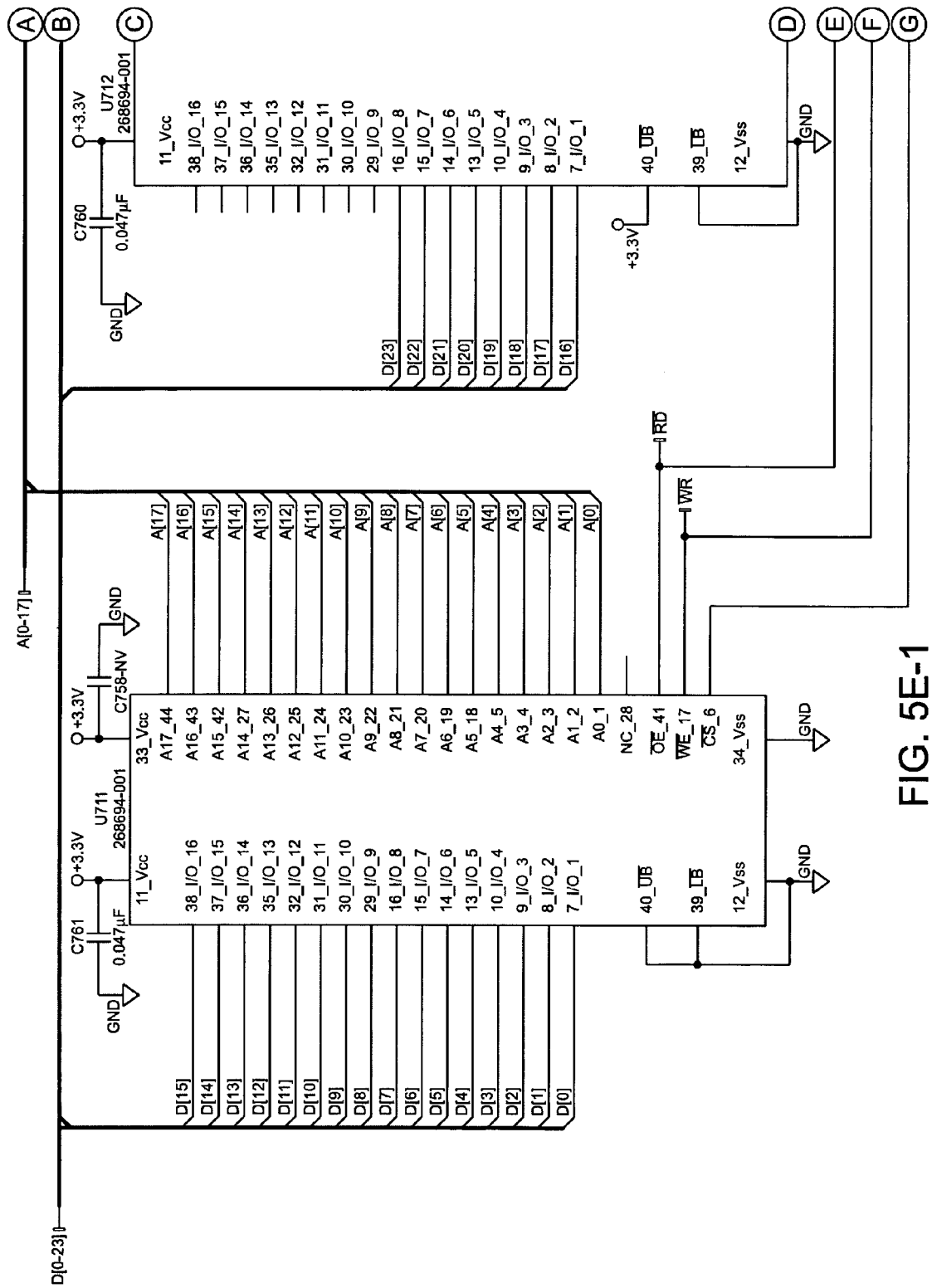
Figures 2, 5E:
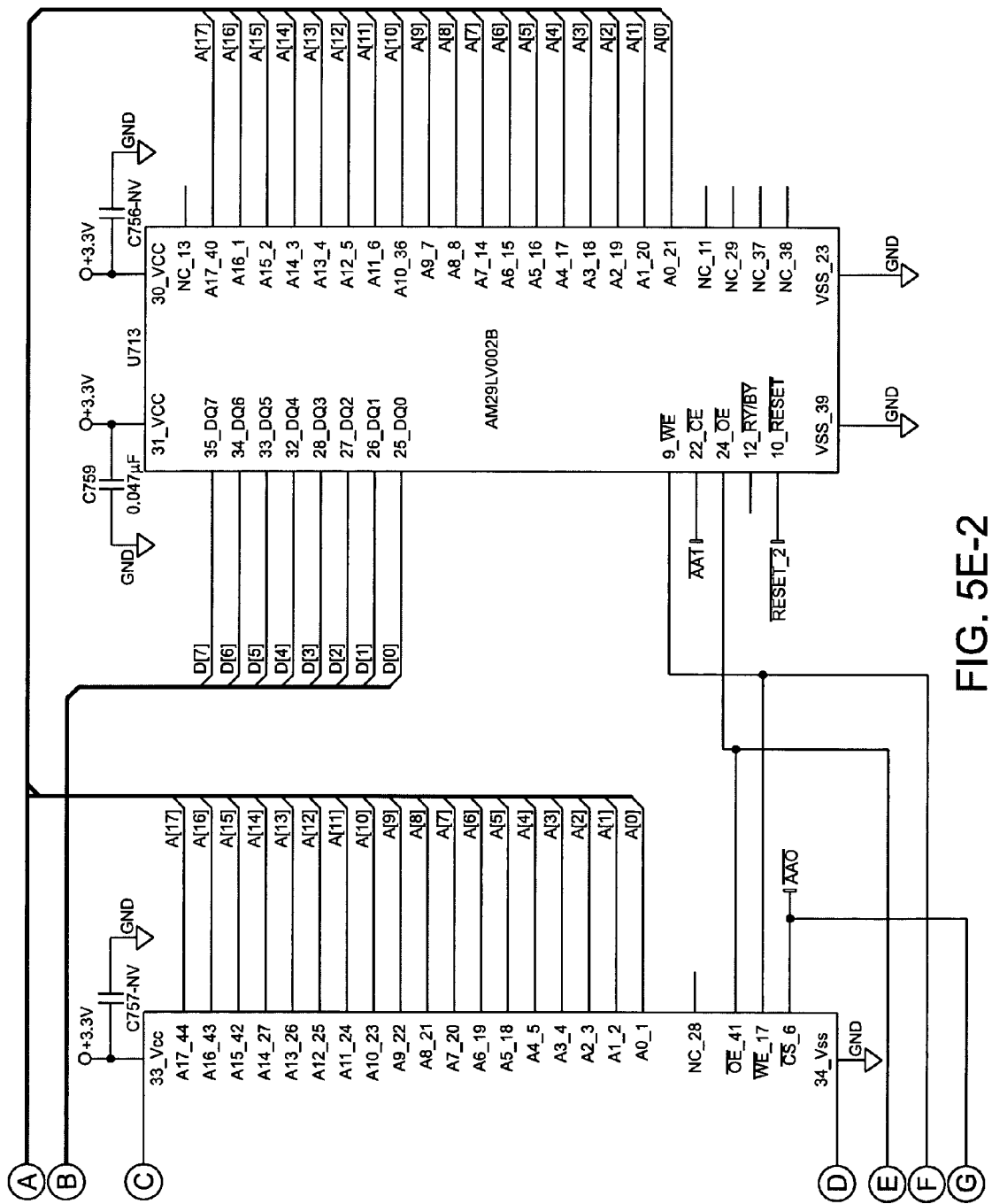
Figures 3, 5E:
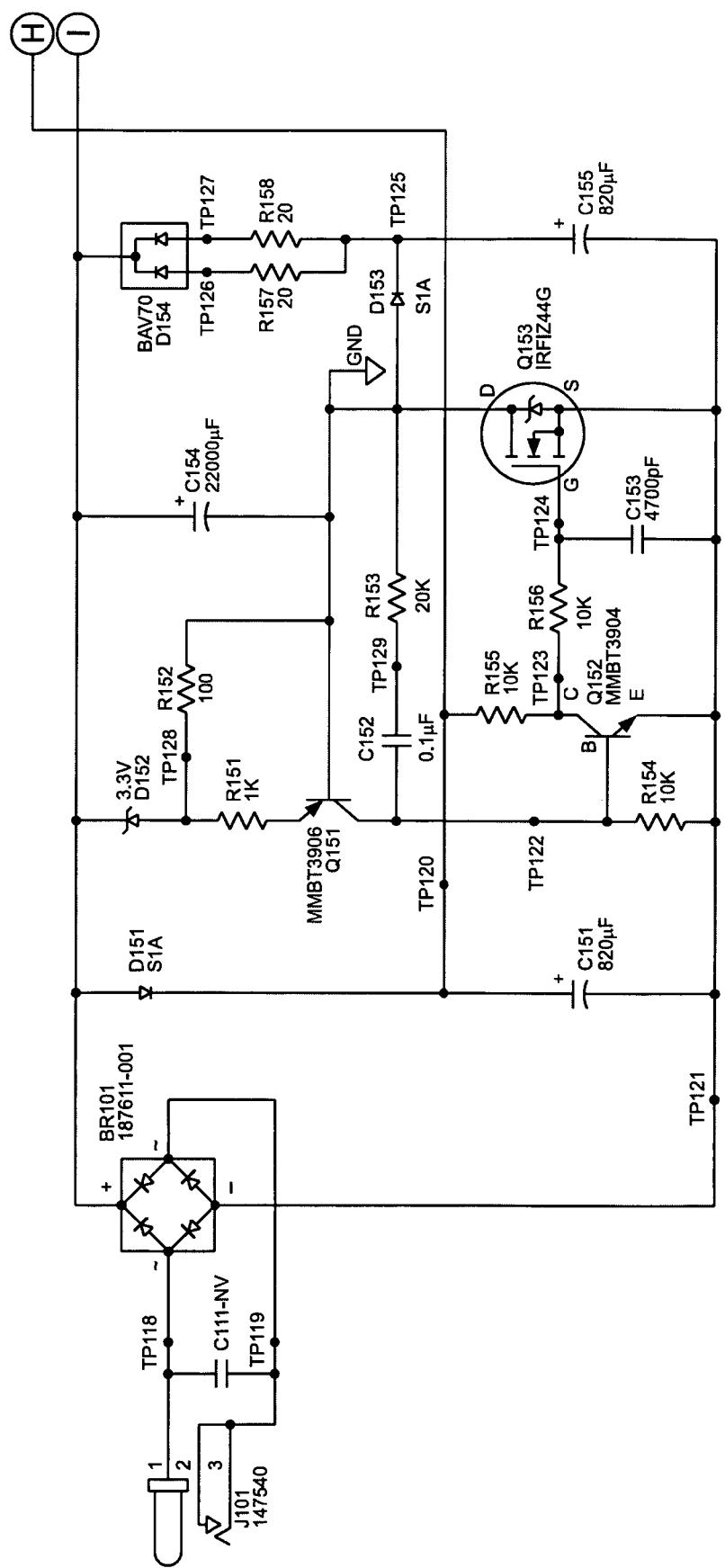
Figures 4, 5E:
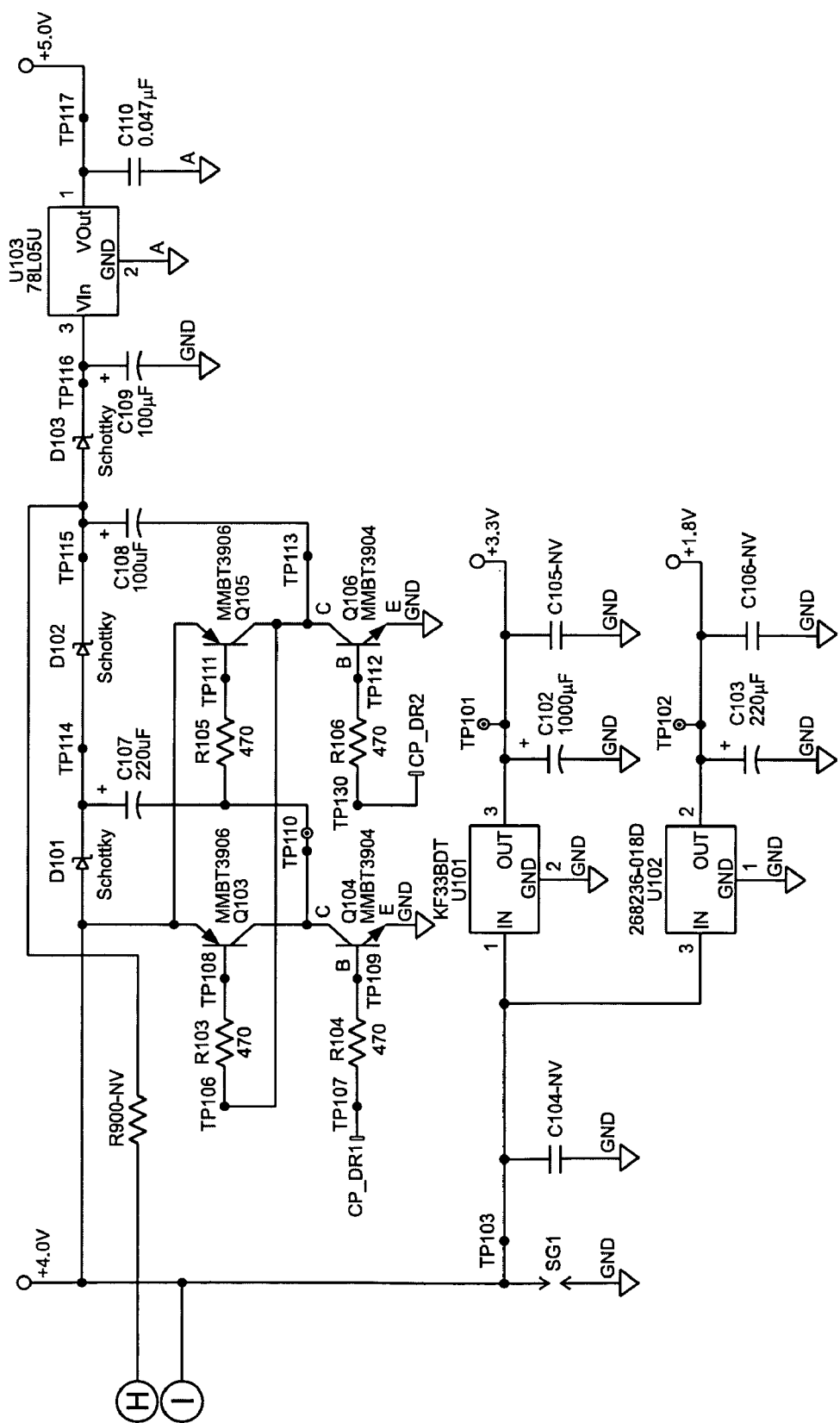
Figure 6:
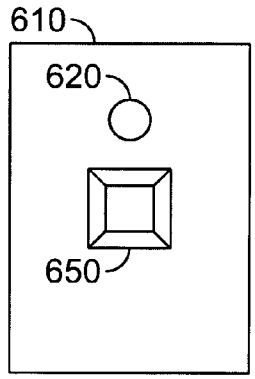
FIG. 6 is a diagrammatic representation of a user interface with a visual indicator and button.
Figure 7:
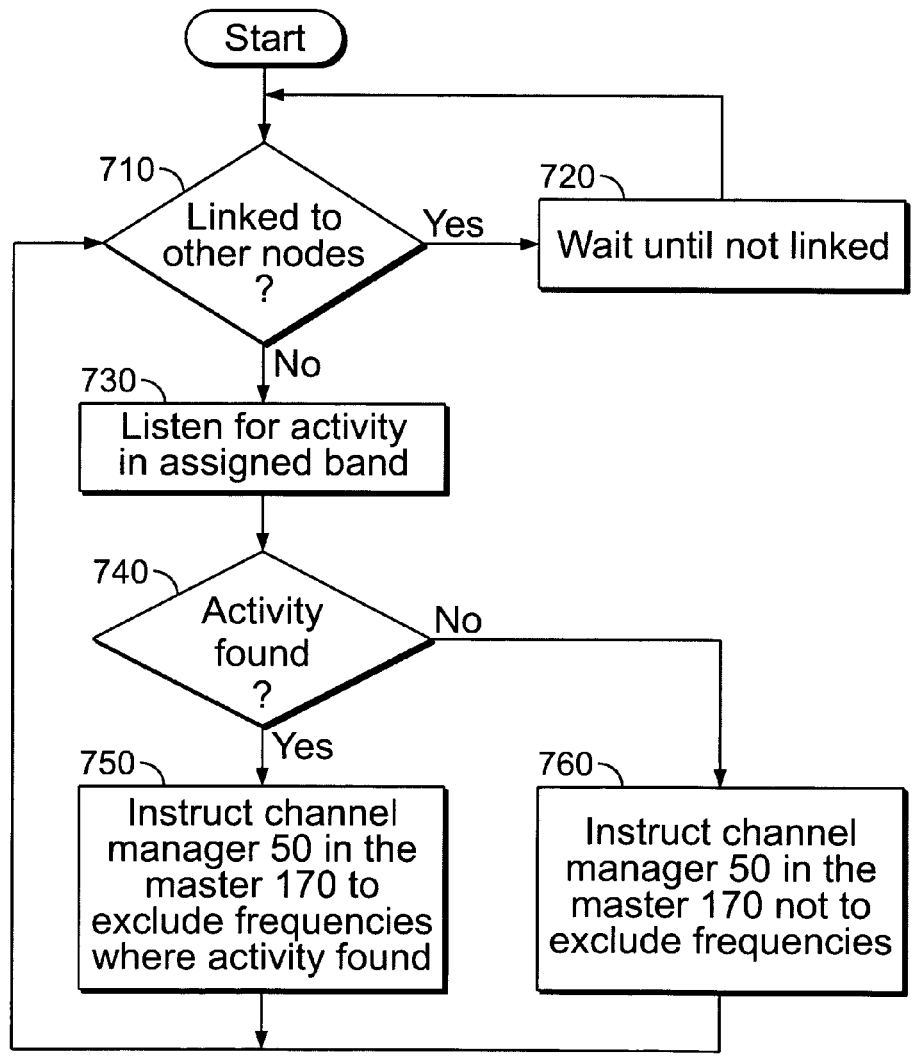
FIGS. 7-9 are flow charts illustrating exemplarily processes according to the invention.
Figure 8:
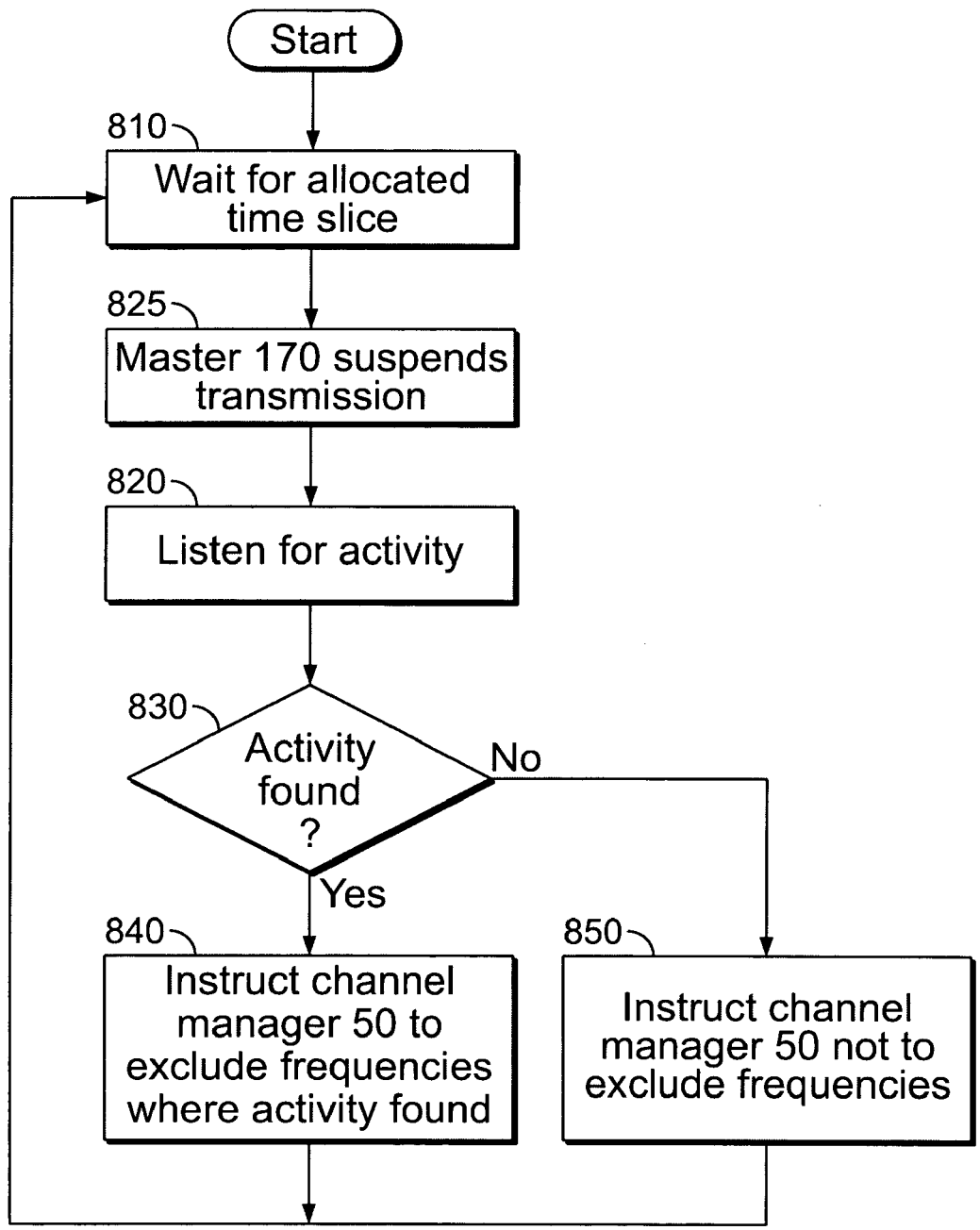
Figure 9:
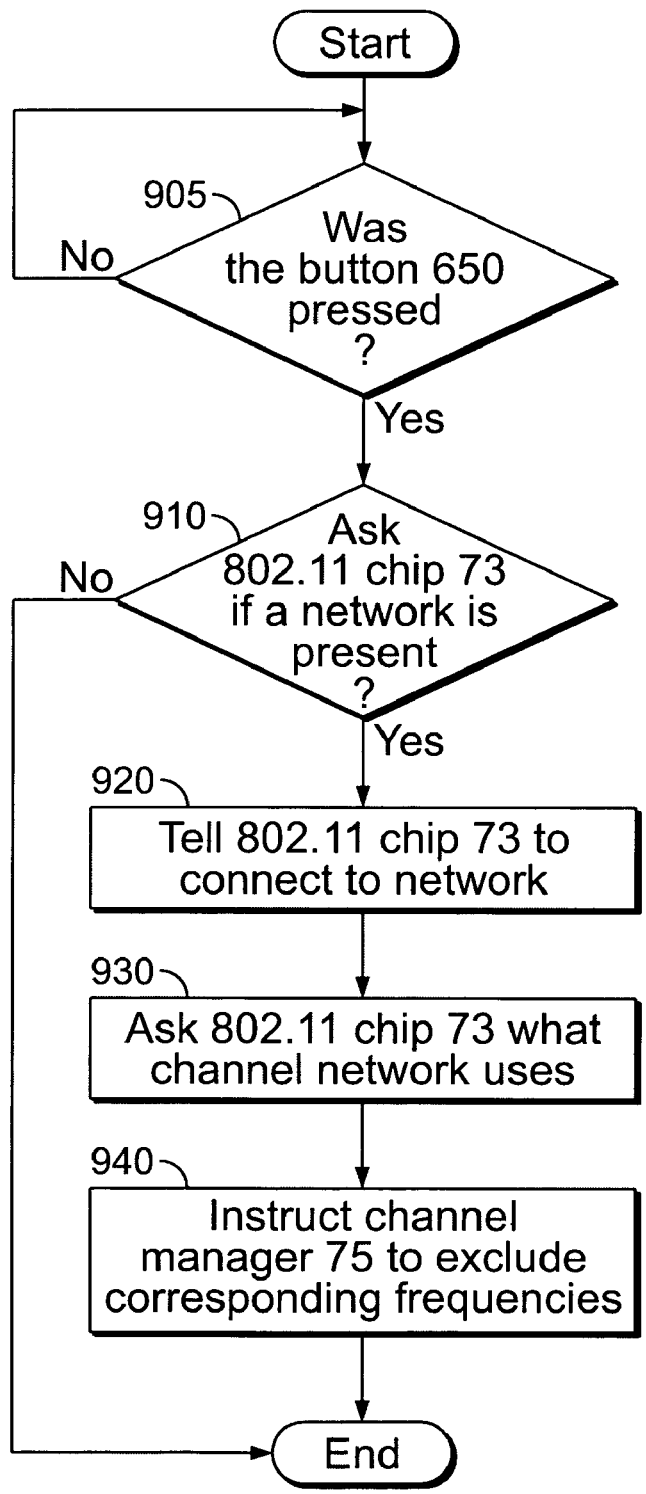
Figure 10:
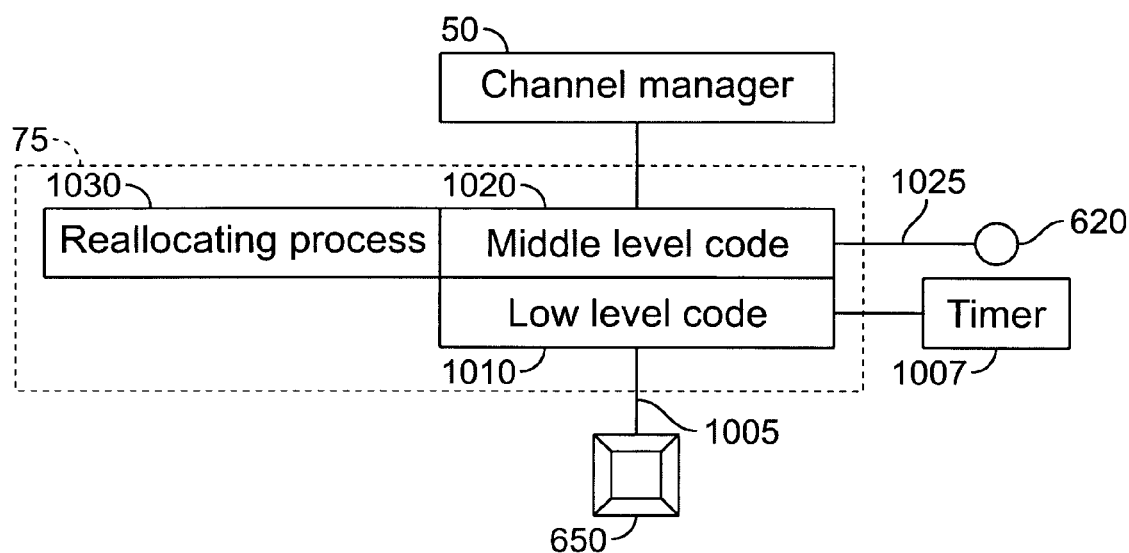
FIG. 10 is a block diagram of channel selector 75.

Referring to FIG. 5E, there is a schematic circuit diagram of the power supply. The output of a transformer is full-wave rectified, processed and converted into a range of DC voltages used in the circuitry.

There has been described novel apparatus and techniques for wireless communicating. It is evident that those skilled in the art can now make numerous uses and modifications of an departures from the specific apparatus and techniques disclosed herein without departing from the inventive concepts. Consequently the invention is to be construed as embracing each and every novel feature and novel combination of features present in or possessed by the apparatus and techniques herein disclosed and limited only by the spirit and scope of the appended claims.

What is claimed is:

1. A communication method for transmitting primary data signals from at least one master to one or more slaves positioned at various spatial locations, the method comprising:
dividing the primary data signals into a plurality of portions;
transmitting at least some of the portions using a preferred configuration list from one or more transmission parameters for different portions;
estimating a transmission quality associated with a group of transmission configurations with the one or more slaves; and
processing the transmission quality estimates to determine a new preferred configuration list wherein probe data signals are transmitted using absent transmission configurations currently absent from the preferred configuration list and measuring a performance of the channel with the absent transmission configurations.

2. The method of claim 1 wherein the probe data signals are dummy data signals that are predetermined and known a priori by the one or more slaves.

3. A wireless communication method for transmitting primary data signals from at least one master to one or more slaves positioned at various spatial locations, the method comprising,
dividing the primary data signals into a plurality of portions;
transmitting at least some of the portions using a preferred frequency list for different portions;
estimating a transmission quality associated with a group of frequencies with the one or more slaves;
transmitting the transmission quality estimates to the master; and
processing the transmission quality estimates at the master to determine a new preferred frequency list wherein probe data signals are transmitted using absent frequencies currently absent from the preferred frequency list for transmitting the data signals and measuring the performance of the channel with the absent frequencies.

4. The method of claim 3 wherein the probe data signals are dummy data signals that are predetermined and known a prior by the one or more slaves.

5. A communication method for transmitting primary data signals from at least one master to one or more slaves positioned at various spatial locations, the method comprising:
dividing the primary data signals into a plurality of portions;
transmitting at least some of the portions using a preferred configuration list from one or more transmission parameters for different portions;
estimating a transmission quality associated with a group of transmission configurations with the one or more slaves; and processing the transmission quality estimates to determine a new preferred configuration list wherein information identifying the transmission configurations on the new preferred configuration list is broadcast to the one or more slaves using more robust error correction/detection coding than that used for transmission of the primary data.

6. The method of claim 5 wherein the primary data signals are error correction encoded, and further comprising splitting the error correction encoded data signal into different portions, transmitting at least some of the portions using different transmission configurations, and error correction decoding at the one or more slaves.

7. The method of claim 6 wherein said error correction decoding includes erasure techniques.

8. The method of claim 6 further comprising deriving error rate information from error correction decoding at the one or more slaves used in providing said transmission quality estimates.

9. A wireless communication method for transmitting primary data signals from at least one master to one or more slaves positioned at various spatial locations, the method comprising,
dividing the primary data signals into a plurality of portions;
transmitting at least some of the portions using a preferred frequency list for different portions;
estimating a transmission quality associated with a group of frequencies with the one or more slaves;
transmitting the transmission quality estimates to the master; and
processing the transmission quality estimates at the master to determine a new preferred frequency list wherein information identifying the frequencies on the new preferred frequency list is broadcast to the one or more slaves using more robust error correction/detection coding than that used for transmission of the data.

10. A communication method for transmitting primary data signals from at least one master to one or more slaves positioned at various spatial locations, the method comprising:
dividing the primary data signals into a plurality of portions;
transmitting at least some of the portions using a preferred configuration list from one or more transmission parameters for different portions;
estimating a transmission quality associated with a group of transmission configurations with the one or more slaves; and
processing the transmission quality estimates to determine a new preferred configuration list wherein the portions of the primary data signals are of unequal size, and further comprising transmitting the larger portions at frequencies associated with higher transmission quality.

11. A wireless communication method for transmitting primary data signals from at least one master to one or more slaves positioned at various spatial locations, the method comprising,
dividing the primary data signals into a plurality of portions;
transmitting at least some of the portions using a preferred frequency list for different portions;
estimating a transmission quality associated with a group of frequencies with the one or more slaves;
transmitting the transmission quality estimates to the master; and
processing the transmission quality estimates at the master to determine a new preferred frequency list wherein the portions of the primary data signals are of unequal size, and further comprising transmitting the larger portions at frequencies associated with higher transmission quality.

12. A communication method for transmitting primary data signals from at least one master to one or more slaves positioned at various spatial locations, the method comprising:
dividing the primary data signals into a plurality of portions;
transmitting at least some of the portions using a preferred configuration list from one or more transmission parameters for different portions;
estimating a transmission quality associated with a group of transmission configurations with the one or more slaves; and
processing the transmission quality estimates to determine a new preferred configuration list further comprising transmitting a system identification signal identifying the master, and conditioning the slave to receive primary data signals from a selected master in response to a system identification (ID) signal identifying that master.

13. A wireless communication method for transmitting primary data signals from at least one master to one or more slaves positioned at various spatial locations, the method comprising,
dividing the primary data signals into a plurality of portions;
transmitting at least some of the portions using a preferred frequency list for different portions;
estimating a transmission quality associated with a group of frequencies with the one or more slaves;
transmitting the transmission quality estimates to the master; and
processing the transmission quality estimates at the master to determine a new preferred frequency list further comprising transmitting a system ID signal identifying the master, and conditioning the slave to receive primary data signals from a selected master in response to a system identification signal identifying that master.

14. A communication system for transmitting primary data signals from at least one master wirelessly to one or more slaves positioned at various spatial locations, the system comprising:
a master having a source of primary data signal divided into a plurality of portions, said master constructed and arranged to transmit at least some of the portions using a preferred transmission configuration list from one or more transmission parameters for different portions;
one or more slaves each having an estimator for estimating the transmission quality associated with a group of transmission configurations; and
a processor responsive to the estimated quality estimates furnishing a new preferred configuration list constructed and arranged with a source of probe data signals are transmitted using the transmission configurations on the potential configuration list to measure the performance of the channel with the transmission configurations.

15. The system of claim 14 wherein the one or more transmission parameters include frequency, and different frequencies represent the transmission configurations, said system constructed and arranged to transmit the probe data signals using the frequencies on the potential frequency list.

16. The system of claim 14 wherein one or more slaves are constructed and arranged with the probe data that are predetermined and known a priori.

17. A communication system for transmitting primary data signals from at least one master wirelessly to one or more slaves positioned at various spatial locations, the system comprising:

- a master having a source of primary data signal divided into a plurality of portions, said master constructed and arranged to transmit at least some of the portions using a preferred transmission configuration list from one or more transmission parameters for different portions;
- one or more slaves each having an estimator for estimating the transmission quality associated with a group of transmission configurations; and
- a processor responsive to the estimated quality estimates furnishing a new preferred configuration list and further comprising at least a second master for transmitting at least a second set of data signals wirelessly to a second set of one or more slaves positioned at various spatial locations, said second master having a second source of primary data signals divided into a second plurality of portions,
- said second master constructed and arranged to transmit at least some of the second portions using a preferred transmission configuration list from one or more transmission parameters for different portions,
- said one or more slaves in said second set each having an estimator estimating the transmission quality associated with a group of transmission configurations, and
- a second processor responsive to the latter estimated quality estimate furnishing a new preferred configuration list.

18. A communication system in accordance with claim 17 wherein said masters are packed into one physical unit with each master constructed and arranged to have a source of a respective primary data signal.

19. A communication system in accordance with claim 18 wherein said masters are constructed and arranged to exchange information signals about the transmission configurations and the transmission quality estimates associated with each transmission.

* * * * *